(12) United States Patent
Shimazaki et al.

(10) Patent No.: US 7,878,533 B2
(45) Date of Patent: Feb. 1, 2011

(54) AIRBAG DEVICE

(75) Inventors: Yoshio Shimazaki, Settsu (JP); Seiichiro Kamura, Settsu (JP); Kou Sasaki, Settsu (JP); Hiroyuki Taniyama, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 398 days.

(21) Appl. No.: 11/994,656

(22) PCT Filed: May 9, 2006

(86) PCT No.: PCT/JP2006/309297

§ 371 (c)(1),
(2), (4) Date: Jan. 4, 2008

(87) PCT Pub. No.: WO2007/007461

PCT Pub. Date: Jan. 18, 2007

(65) Prior Publication Data

US 2009/0079167 A1 Mar. 26, 2009

(30) Foreign Application Priority Data

Jul. 7, 2005 (JP) .............................. 2005-198743
Sep. 8, 2005 (JP) .............................. 2005-260667

(51) Int. Cl.
B60R 21/16 (2006.01)
B60R 21/20 (2006.01)

(52) U.S. Cl. ..................... 280/731; 280/740; 280/742

(58) Field of Classification Search ............. 280/728.1, 280/731, 740, 742
See application file for complete search history.

(56) References Cited

U.S. PATENT DOCUMENTS

| 3,907,330 A | 9/1975 | Kondo et al. |
| 5,558,365 A | 9/1996 | Oe et al. |
| 5,560,264 A | 10/1996 | Xolin et al. |
| 5,887,892 A | 3/1999 | Burdack et al. |

(Continued)

FOREIGN PATENT DOCUMENTS

DE 19809198 A1 9/1998

(Continued)

OTHER PUBLICATIONS

European Search Report corresponding to European Patent Application No. 06746128.5, dated Jan. 27, 2010.

(Continued)

*Primary Examiner*—Ruth Ilan
(74) *Attorney, Agent, or Firm*—Sughrue Mion, PLLC

(57) ABSTRACT

There is provided an airbag device for allowing a holding member to firmly hold an outer circumference part and a peripheral edge part of an airbag during the airbag assembling work and to reduce the assembling work time. The airbag device comprising a holding member (14) for holding an airbag (10) in a state as folded and contained therein, and pressing down a side face of the airbag (10) on the outer circumference thereof. The holding member (14) is made of a woven cloth, and an anticipated rupture part (14k) to be ruptured by a gas generated from an inflator (30) is formed at the position corresponding to the part of the airbag (10), inflating in the initial stage of the expansion thereof.

6 Claims, 23 Drawing Sheets

U.S. PATENT DOCUMENTS

| | | | |
|---|---|---|---|
| 5,899,487 A | | 5/1999 | Fischer |
| 5,924,725 A | | 7/1999 | Kozyreff et al. |
| 6,070,904 A | * | 6/2000 | Ozaki et al. .............. 280/743.1 |
| 6,206,409 B1 | * | 3/2001 | Kato et al. ................ 280/728.2 |
| 6,217,067 B1 | * | 4/2001 | Derrick ....................... 280/742 |
| 6,588,794 B1 | | 7/2003 | Derrick et al. |
| 6,669,229 B2 | | 12/2003 | Thomas |
| 6,672,614 B2 | | 1/2004 | Endo et al. |
| 6,739,620 B2 | | 5/2004 | Derrick |
| 6,981,719 B2 | | 1/2006 | Igawa |
| 7,152,875 B2 | | 12/2006 | Kai |
| 7,261,317 B2 | | 8/2007 | Amamori |
| 7,445,238 B2 | * | 11/2008 | Marriott ..................... 280/740 |
| 2001/0042978 A1 | | 11/2001 | Frisch |
| 2002/0089155 A1 | * | 7/2002 | Tajima et al. ............... 280/732 |
| 2004/0195808 A1 | * | 10/2004 | Amamori ................. 280/728.2 |
| 2004/0207186 A1 | * | 10/2004 | Kai ............................ 280/731 |
| 2006/0012157 A1 | * | 1/2006 | Ishiguro et al. ............. 280/731 |
| 2006/0267319 A1 | | 11/2006 | Frisch et al. |

FOREIGN PATENT DOCUMENTS

| | | |
|---|---|---|
| DE | 202004002698 U1 | 4/2005 |
| EP | 1464551 A1 | 10/2004 |
| JP | 3-38254 U | 4/1991 |
| JP | 8-268198 A | 10/1996 |
| JP | 11-59310 A | 3/1999 |
| JP | 11-180240 A | 7/1999 |
| JP | 11-278189 A | 10/1999 |
| JP | 11-321508 A | 11/1999 |
| JP | 200085511 A | 3/2000 |
| JP | 2000-127881 A | 5/2000 |
| JP | 2001-163143 A | 6/2001 |
| JP | 2001-180427 A | 7/2001 |
| JP | 2002067851 A | 3/2002 |
| JP | 2002-166808 A | 6/2002 |
| JP | 2003-226213 A | 8/2003 |
| JP | 2004-122940 A | 4/2004 |
| JP | 2004-256091 A | 9/2004 |
| JP | 2006-341715 A | 12/2006 |
| WO | 98/14353 A1 | 4/1998 |

OTHER PUBLICATIONS

European Search Report dated Feb. 2, 2010, corresponding to EP 06756409.
Chinese Office Action, dated Jun. 19, 2009.
U.S. Appl. No. 11/916,834, entitled Airbag Device and filed Dec. 7, 2007.
International Search Report for PCT/JP2006/310103, dated Jun. 13, 2006.

* cited by examiner

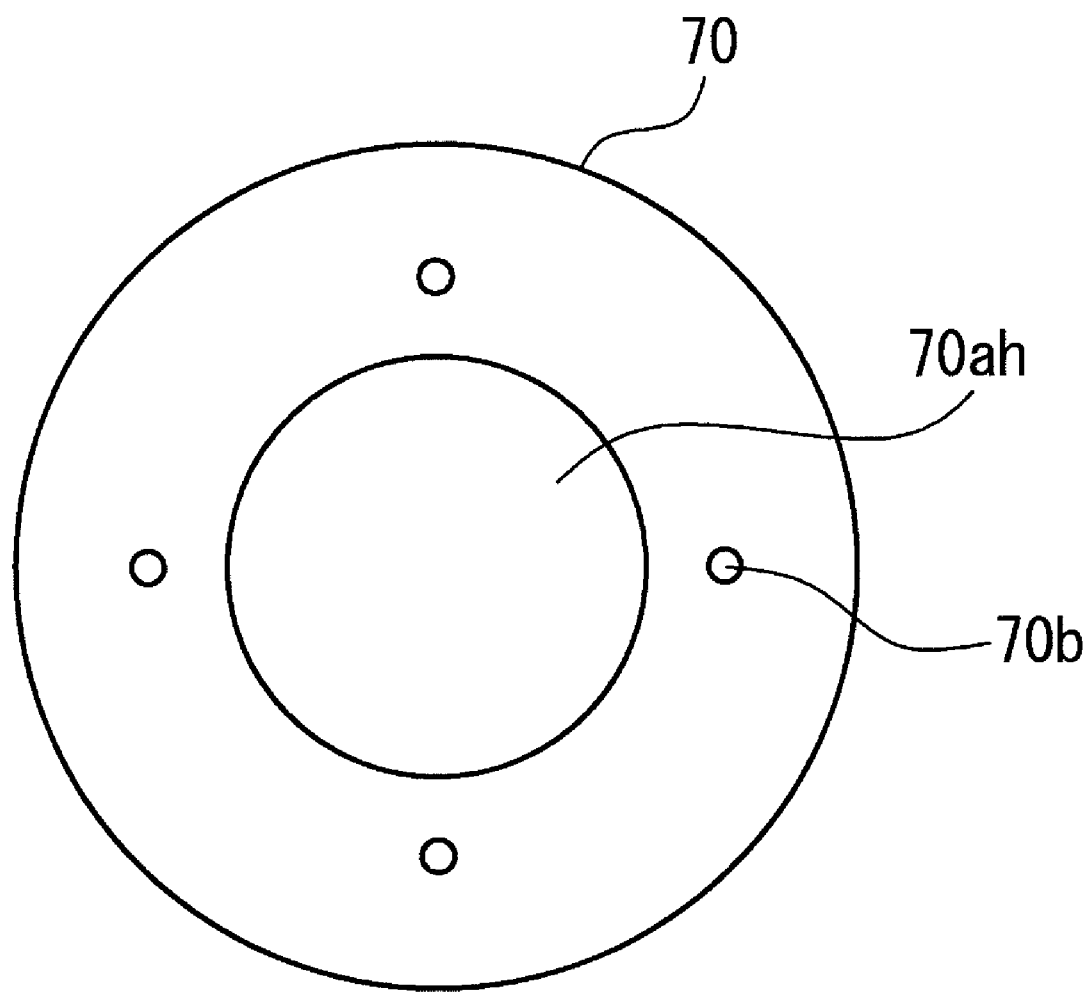

Prior Art

Prior Art

AIRBAG DEVICE

TECHNICAL FIELD

The invention relates to an airbag device for use in an automobile, in particular, to an airbag device provided with a holding member for holding an airbag and a gas rectification member for rectifying the direction of flow of gas generated from an inflator.

BACKGROUND OF THE INVENTION

For an airbag device installed on the central part of a steering device, there is an invention of the application No. 2005-168867 as filed earlier by the applicant of this application, wherein a decorative member is provided on the central part of the airbag device, and on the outer circumference thereof, an airbag cover is provided having tear-lines on the back side thereof, and a holding member for holding the airbag as folded in the airbag cover and having an opening formed for facilitating the inflation and expansion of the airbag at substantially the center thereof is contained in the airbag device.

FIG. 24 is a front view of a steering wheel provided with the airbag device that is the invention of the earlier filed application and FIG. 25 is a cross-sectional view taken along arrows I-I of FIG. 24. As shown in FIGS. 24 and 25, the airbag device MR is assembled into the central part of a steering wheel of a vehicle, and comprises a decorative member 40, an airbag 10, and an airbag cover 16. For convenience's sake, an occupant side is referred to as a front side while a side opposite from the front side is referred to as a back side in the present specification.

The airbag device MR is assembled into the central part of a steering wheel 50R of a vehicle, and comprises a decorative member 40R, an airbag 10R and an airbag cover 16R.

The airbag 10R comprises an airbag main body 10Ra and a tubular tether belt 11Ra for constraining an extension length of the airbag main body 10Ra, and the airbag 10R folded like bellows toward the occupant side is contained within the airbag cover 16R. The airbag 10R is covered with a holding member 14R in such a way as to press down a side face of the airbag 10R, on the outer circumference thereof, to thereby restrain the inflation and expansion of the airbag 10R, in the direction of the side face thereof. The main body 10Ra, and the holding member 14R are secured to a base plate 24R by a cushion ring 22R inserted into the airbag 10R. Further, the airbag cover 16R is secured to the base plate 24R in such a way as to cover up airbag 10 and such.

Meanwhile, an end of the tubular tether belt 11Ra is positioned on the rear face of a depressed part 16Ra formed on the occupant side of the airbag cover 16R, and an attachment bolt 40Ra protruding toward the back face of the decorative member 40R is secured to a connecting member 20R with a nut, thereby clamping the end of the tubular tether belt 11Ra between those members. The holding member 14R for holding the airbag 10R as folded is provided with an opening 14Rh circular in shape at the central part thereof (see FIG. 26, described later), and it is contained in the airbag cover 16R with the tubular outer circumferential part of the decorative member 40R being inserted into the opening 14Rh. The end of the connecting member 20R is clamped between the cushion ring 22R and the base plate 24R and is secured to the base plate 24R. Denoted by numeral 12'R is a gas rectification member, described in detail later.

FIG. 26 is an expansion view of the holding member 14R. The opening 14Rh for facilitating inflation and expansion of the airbag is formed at the center of the holding member 14R.

The holding member 14R is made of a woven cloth and approximate square in shape, and eight holes 14Rah, 14Rbh, to be engaged with the bolts 22Rd of the cushion ring 22R, are provided at the centers of four sides of approximate square, and at corners along diagonal lines thereof. The diameter of the opening 14Rh of the holding member 14R is larger than that of the depressed part 16Ra of the airbag cover 16R and that of the decorative member 40R and is formed to allow the folded airbag to pass through a gap defined therebetween.

FIG. 27 is a perspective view showing the state where the airbag 10R as folded is held by the holding member 14R. The central hole 11Rah is a hole of the tubular tether belt 11Ra for insertion with the bolt 40Ra, and the tubular tether belt 11Ra folded inside the opening 14Rh of the holding member 14R is held by the holding member 14R. A part of the airbag held by the periphery of the opening 14Rh of the holding member 14R is referred to as a peripheral edge part, and the part of airbag held by the outer circumference of the holding member 14R is referred to as an outer circumference part. The holding member 14R is provided to prevent the state of folding of the airbag 10R from being collapsed by holding the outer circumference part and the peripheral edge part of the airbag 10R.

When packing the folded airbag 10R by the holding member 14R, there is a case where the peripheral edge part of the airbag 10R as folded to be held by the opening 14Rh of the holding member 14R is not appropriately held by the opening 14Rh. Even in the case where the peripheral edge part of the airbag 10R is appropriately held by the opening 14Rh, there is a case where the peripheral edge part of the airbag 10R contacts the airbag cover 16R so that the airbag 10R as folded is contained in the airbag cover 16R while it is deviated from the opening 14Rh of the holding member 14R, when the airbag 10R as folded is contained in the airbag cover 16R.

If the airbag 10R is once contained in the airbag cover 16R in this state, there is a risk of exerting a harmful influence upon an expansion performance of the airbag 10R. However, since the state of holding of the holding member 14R cannot be confirmed, the airbag 10R is packed while paying attention to that the peripheral edge part of the airbag 10R is held by the opening 14Rh, thereafter the airbag 10R is accommodated in the airbag cover 16R while paying attention not to cause the peripheral edge part of the airbag 10R to contact the airbag cover 16R to be deviated from the opening 14Rh. As a result, time is taken for packing and accommodating works serving as an assembling work of the airbag 10R.

If the airbag 10R is held by the holding member 14R in such a state, the folded-state of the airbag 10R is collapsed when the inflator 30R is actuated so that the part of the airbag above the hole of the gas exhaust hole 30Ra of the inflator 30R is exponentially pushed out in the direction of expansion of the airbag, thereby rupturing tear lines provided at the rear face of the airbag cover 16R so that these airbag portions burst out largely toward the driver seat side to exert an harmful influence upon the expansion performance.

On the other hand, the airbag device has conventionally provided with a gas rectification member for rectifying the direction of flow of gas generated from the inflator and supplying flow of gas to a part of the airbag, inflating in the initial stage of expansion thereof, thereby smoothly expanding the airbag (see Patent Document 2).

FIG. 28 is a sectional view of such an airbag device. An airbag device 10P comprises a case 12P, an airbag 14P, an inflator 16P and a gas rectification member 18P wherein the airbag 14P undergoes inflation and expansion by an inflated pressure of the airbag 14P due to the actuation of the inflator 16P while the opening of the gas rectification member 18P is attached to an opening peripheral edge part 12aP of the case 12P together with the airbag 14P via a bag retainer 26P.

FIG. 29 is an exploded perspective view of the airbag device 10P. The gas rectification member 18P is disposed between the inflator 16P and the airbag 14P in the case 12P, and is expanded inside the airbag 14P due to a gas generated from the inflator 16P, and it is formed in the shape of a bag by stitching one or plural pieces of basic fabrics three dimensionally for supplying the gas from gas exhaust ports 30P, 30aP toward the interior of the airbag 14P.

The case 12P has a plurality of fixing ports 20P at the opening peripheral edge part 12aP so as to attach and secure the airbag 14P and gas rectification member 18P as shown in FIG. 28. Further, the case 12P has an insertion port 22P at the bottom side face thereof through which the inflator 16P is inserted.

When assembling, as shown in FIG. 29, a tip end 18aP of the gas rectification member 18P is inserted into the folded airbag 14P from behind. At that time, the tip end 18aP of the gas rectification member 18P is inserted into the folded airbag 14P from below, then four attachment parts 32P of the gas rectification member 18P are overlaid on corresponding attachment parts 28P of the airbag 14P from the outside.

According to the conventional airbag device 10P, the airbag 14P is folded in a state to be separated from the gas rectification member 18P, then the gas rectification member 18P is inserted into the folded airbag 14P, subsequently both the gas rectification member 18P and the airbag 14P are secured to the case 12P. When the gas rectification member 18P is inserted into the airbag 14P as folded, a space between an upper surface portion 34P and a lower surface portion 36P of the airbag 14P as folded is expanded from below so that the airbag 14P is not collapsed, and the tip end 18aP of the gas rectification member 18P is inserted into the expanded space, so that a work for supporting the airbag 14P and an operation for inserting the gas rectification member 18P are necessary to be implemented at the same time, arising a problem that the work for inserting the gas rectification member 18P in the airbag device 10P becomes troublesome.

Further, when the gas rectification member 18P is attached to the airbag device 10P, the attachment parts 32P of the gas rectification member 18P are overlaid on the attachment parts 28P of the airbag 14P from the outside while positions of the fixed holes provided in the attachment parts 28P, 32P are aligned with one another, subsequently a plurality of fixed holes 20P provided in the opening peripheral edge part 12aP of the case 12P are overlaid on the fixed holes of the attachment parts 28P, 32P while they are aligned with one another, subsequently a screw and so forth are inserted into the fixed holes to be threaded therebetween, then the gas rectification member 18P is secured thereto. Described as above, there is a problem that a work for attaching the gas rectification member 18P to the airbag device 10P is troublesome and takes time, resulting in not improving work efficiency.

Patent Document 1: JP 2005-168867
Patent Document 1: JP 2001-163143 A

DISCLOSURE OF THE INVENTION

Problems to be Solved by the Invention

The invention has been developed in order to solve problems described as above, and it is a first object of the invention to allow a holding member to firmly hold an outer circumference part and a peripheral edge part of an airbag during the airbag assembling work and to reduce the assembling work time.

It is a second object of the invention to facilitate an assembling work of an airbag device provided with a gas rectification member and improve efficiency in the assembling work.

Means for Solving the Problem

To achieve the above object, the invention disclosed in a first embodiment is an airbag device comprising an inflator, an airbag communicating with the inflator, for undergoing inflation by a gas generated from the inflator, and a holding member for holding the airbag in a state as folded and contained therein, and pressing down a side face of the airbag, on the outer circumference thereof, to thereby restrain inflation and expansion of the airbag, in the direction of the side face thereof, caused by the gas generated from the inflator at least in the initial stage of the expansion of the airbag, a gas rectification member for rectifying and guiding the gas generated from the inflator up to the vicinity of a part of the airbag, inflating in the initial stage of the expansion thereof, characterized in that the holding member is made of a woven cloth and an anticipated rupture part to be ruptured by the gas generated from the inflator at the position corresponding to the part of the airbag inflating in the initial stage of the expansion thereof.

The invention disclosed in a second embodiment is the airbag device disclosed in the first embodiment characterized in that the part of the airbag, inflating in the initial stage of the expansion thereof, undergoes inflation and expansion by the gas guided by the gas rectification member.

The invention disclosed in a third embodiment is the airbag device disclosed in the first embodiment characterized in that the anticipated rupture part are formed by perforations.

The invention disclosed in a fourth embodiment is the airbag device disclosed in the third embodiment characterized in that rupture stop parts are formed on tip ends of the anticipated rupture parts.

The invention disclosed in a fifth embodiment is the airbag device disclosed in the fourth embodiment characterized in that the anticipated rupture parts are formed radially from the center of the woven cloth.

The invention disclosed in a sixth embodiment is the airbag device disclosed in the fifth embodiment characterized in that rupture stop parts are formed on the circumference of the concentric circle from the center of the woven cloth.

The invention disclosed in a seventh embodiment is the airbag device disclosed in any of the first to third embodiments characterized in that the holding member has a hole for a fixture member at substantially the center thereof.

The invention disclosed in an eighth embodiment is the airbag device disclosed in the seventh embodiment characterized in that the size of the anticipated rupture part of the holding member is larger than a diameter of a decorative member provided at substantially the central part of the airbag device.

The invention disclosed in a ninth embodiment is an airbag device comprising an inflator, an airbag having an inflator attachment opening at the center thereof and inflatably folded by flow of a gas from the inflator, a cushion ring provided with a retaining means disposed inside the airbag in the vicinity of the inflator attachment opening to be retained by the airbag, and a base plate disposed outside the airbag opposite to the cushion ring, characterized in that a gas rectification member for guiding the gas from the inflator to the airbag is overlaid on the airbag and retained by the retaining means, gas rectification pieces are disposed to extend along an inner circumference of the airbag as folded, and the airbag and the gas rectification member are secured to the base plate by the retaining means of the cushion ring.

The invention disclosed in a tenth embodiment is an airbag device comprising an inflator, an airbag having an inflator attachment opening at the center thereof and inflatably folded by flow of a gas from the inflator, a holding member for holding the airbag in as-folded state by enveloping the airbag from the outside, a cushion ring provided with a retaining means disposed inside the airbag in the vicinity of the inflator attachment opening to be retained by the airbag and the holding member, and a base plate disposed outside the airbag opposite to the cushion ring, characterized in that a gas rectification member for guiding a gas from the inflator to the airbag is overlaid on the holding member and retained by the retaining means of the cushion ring, gas rectification pieces are disposed to extend along an inner circumference of the airbag as folded, and the airbag, the holding member and the gas rectification member are secured to the base plate by the retaining means of the cushion ring.

The invention disclosed in an eleventh embodiment is the airbag device disclosed in either the ninth or tenth embodiments characterized in that the gas rectification member has a plurality of gas rectification pieces and attachment parts for attaching to the retaining means of the cushion ring, and the gas rectification pieces each have a width to form a region overlapped with each other when disposed inside the airbag as folded.

The invention disclosed in a twelve embodiment is the airbag device disclosed in either the ninth or tenth embodiment characterized in that the gas rectification member comprises one piece of gas rectification piece provided with a plurality of attachment parts for attaching to the retaining means of the cushion ring, wherein the length of a tip end of the gas rectification piece has a length in the direction of an inner circumference that is larger than the inner circumference of the airbag when the gas rectification piece is disposed inside the airbag as folded, and cut grooves directing to the tip end of the gas rectification piece are provided between a plurality of attachments parts.

The invention disclosed in a thirteenth embodiment is the airbag device disclosed in the tenth embodiment characterized in that the holding member and the gas rectification member having a plurality of gas rectification pieces provided at the peripheral edge of the holding member are integrally formed.

The invention disclosed in a fourteenth embodiment is the airbag device disclosed in any of the ninth to thirteenth embodiments characterized in that the retaining means of the cushion ring are bolts attached to the cushion ring, and attachment parts of the gas rectification member each has a hole through which the bolts of the cushion ring are inserted.

Advantageous Effect of the Invention

According to the invention, the following effects can be obtained.

(1) Since the holding member firmly holds an outer circumference part and a peripheral edge part of an airbag during the airbag assembling work, the state of folding of the airbag is not collapsed and the assembling work time for assembling the airbag to the airbag cover can be reduced.

(2) Since the holding member has the anticipated rupture part formed by perforations, the holding member is easily ruptured in the initial stage of expansion of the airbag, so that the airbag can be smoothly expanded.

(3) Since the holding member has the rupture stop part, it can prevent the holding member from being cut beyond the perforations of the anticipated rupture part when the anticipated rupture part is ruptured in the initial stage of expansion of the airbag, and the part of the airbag inflating in the initial stage of the expansion thereof can be easily expanded.

(4) Since the joints of the perforations of the anticipated rupture part are located at positions to be pulled out by the bolts to be engaged in the holes provided at centers of the four sides, the engagement state at four spots is kept balanced.

(5) Since the gas rectification member can be disposed at the center of the airbag by merely attaching the gas rectification member to the airbag or holding member attached to the retaining means of the cushion ring while overlaid thereon, and the disposition of the gas rectification member is completed by merely stretching the gas rectification pieces along the inner circumference of the airbag, and further the airbag or the airbag, the holding member and the gas rectification member assembled as such can be attached to the base plate by the retaining means of the cushion ring, the assembling work of the airbag device provided with the gas rectification member can be implemented with ease and the working efficiency can be improved.

BRIEF DESCRIPTION OF THE DRAWINGS

FIG. 5A is a see-through perspective view of an inflated airbag while

FIG. 10 is an expansion view of a periphery-protective member for protecting a peripheral part provided around an inflator attachment opening;

EXPLANATION OF NUMERALS

10 . . . airbag, 10a . . . airbag main body, 11a . . . tubular tether belt, 12 . . . protective member, 12 (12L, 12M, 12N, 14N), 12' . . . gas rectification member, 14 . . . holding member, 16 . . . airbag cover, 20 . . . connecting member, 22 . . . cushion ring, 24 . . . base plate, 30 . . . inflator

BEST MODE FOR CARRYING OUT THE INVENTION

Figure 1:
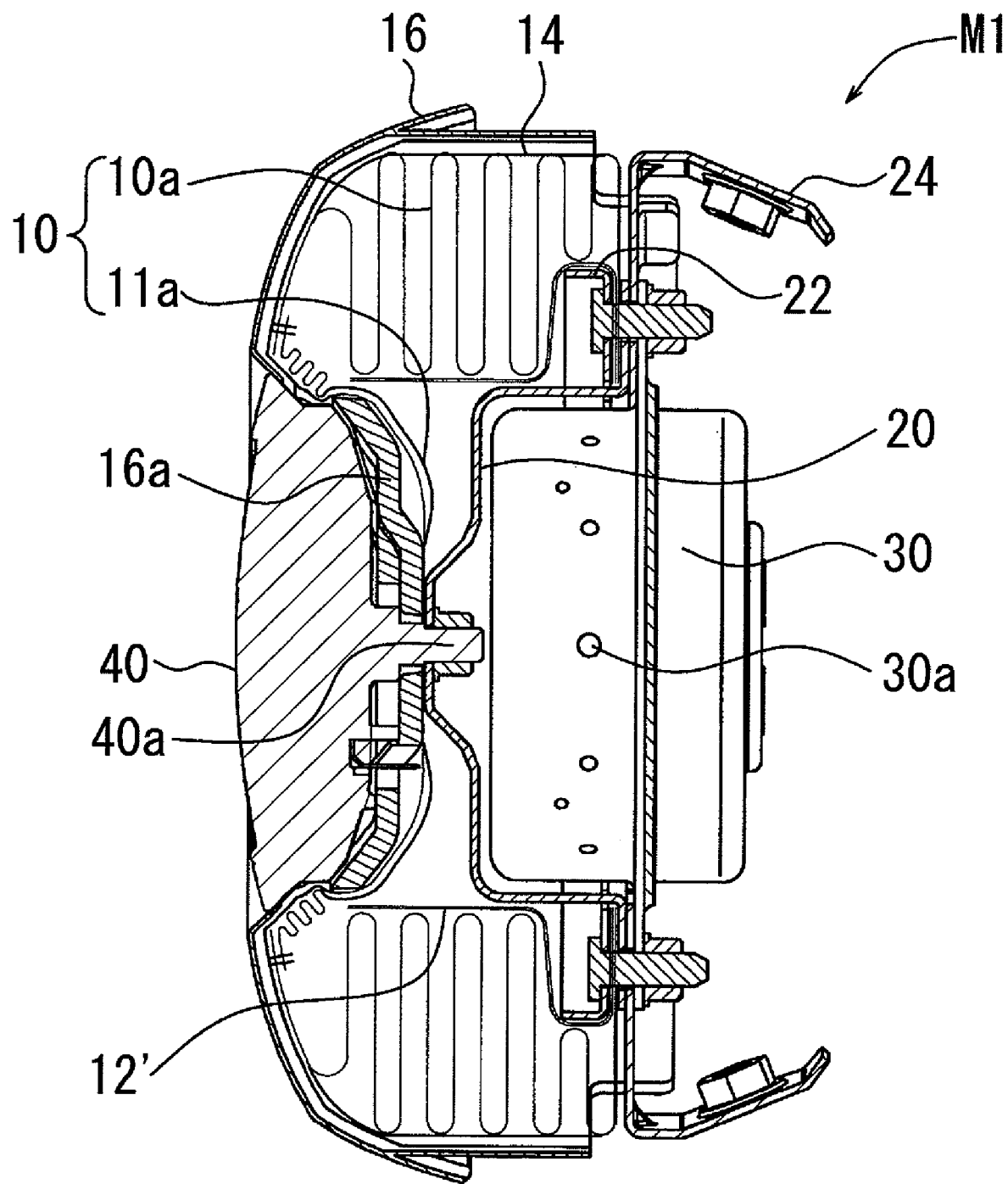
FIG. 1 is a sectional view of an airbag device.

There is described hereinafter an airbag device using a holding member according to an embodiment with reference to the accompanying drawings. FIG. 1 is a cross-sectional view of an airbag device M1. The airbag device M1 is assembled into the central part of a steering wheel of a vehicle in the same way as the airbag device MR of the prior invention, and comprises a decorative member 40, an airbag 10, and an airbag cover 16 and so forth, while the airbag 10 comprises an airbag main body 10a and a tubular tether belt 11a for restricting an extension length of the airbag main body 10a, and the airbag 10 folded like bellows toward the occupant side is contained within the airbag cover 16. The airbag 10 is covered with a holding member 14 in such a way as to press down a side face of the airbag 10 on the outer circumference thereof, to thereby restrain inflation and expansion of the airbag 10 in the direction of the side face thereof.

Figure 24:
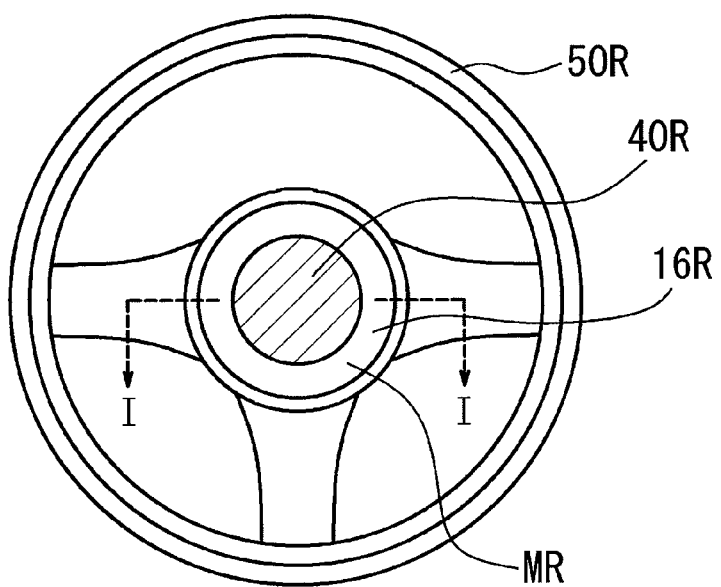
FIG. 24 is a front view of a steering wheel provided with the airbag device.
Figure 25:
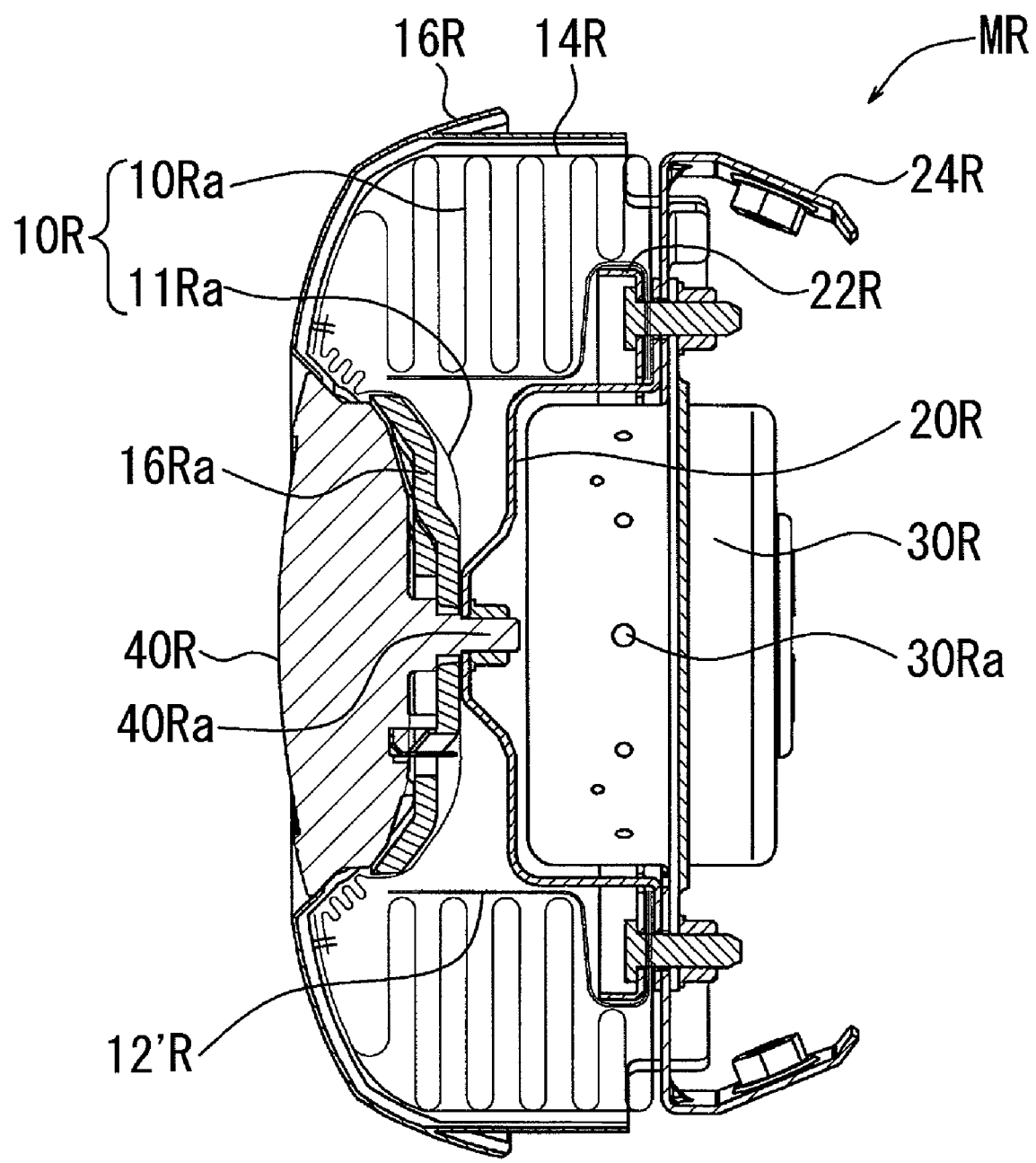
FIG. 25 is a cross-sectional view taken along arrows I-I of FIG. 24.
Figure 26:
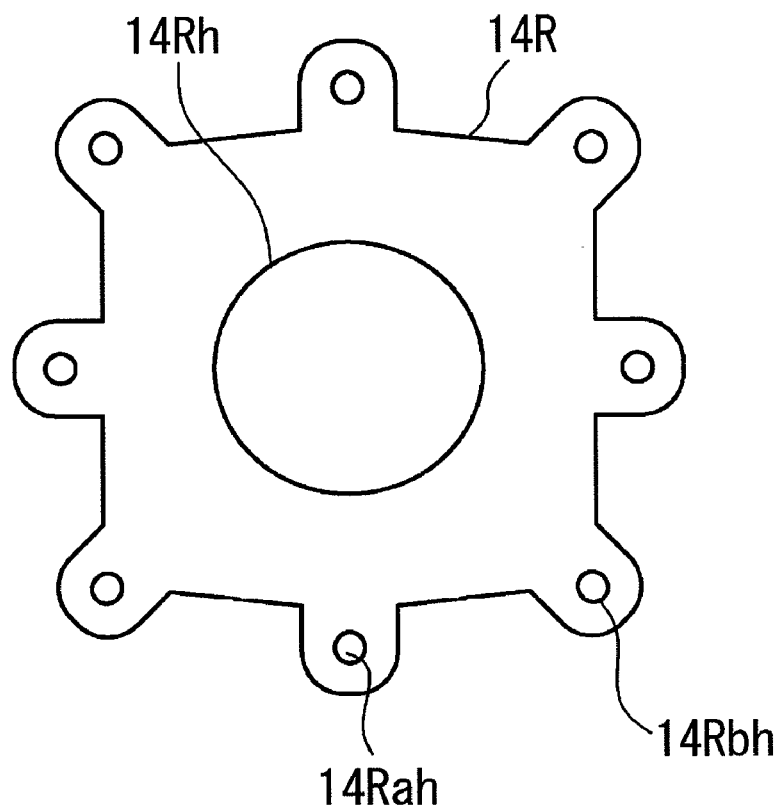
FIG. 26 is an expansion view of the holding member.
Figure 27:
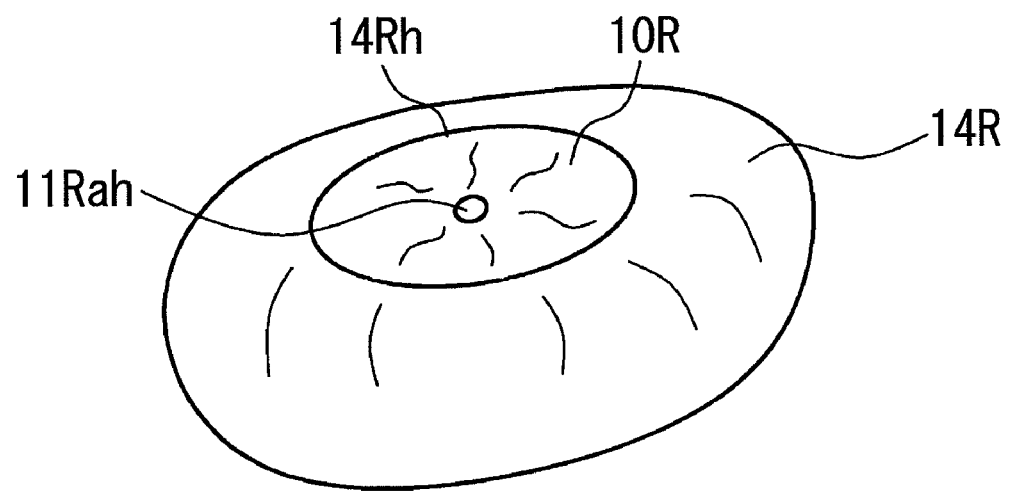
FIG. 27 is a perspective view showing a state where the folded airbag is held by the holding member.
Figure 28:
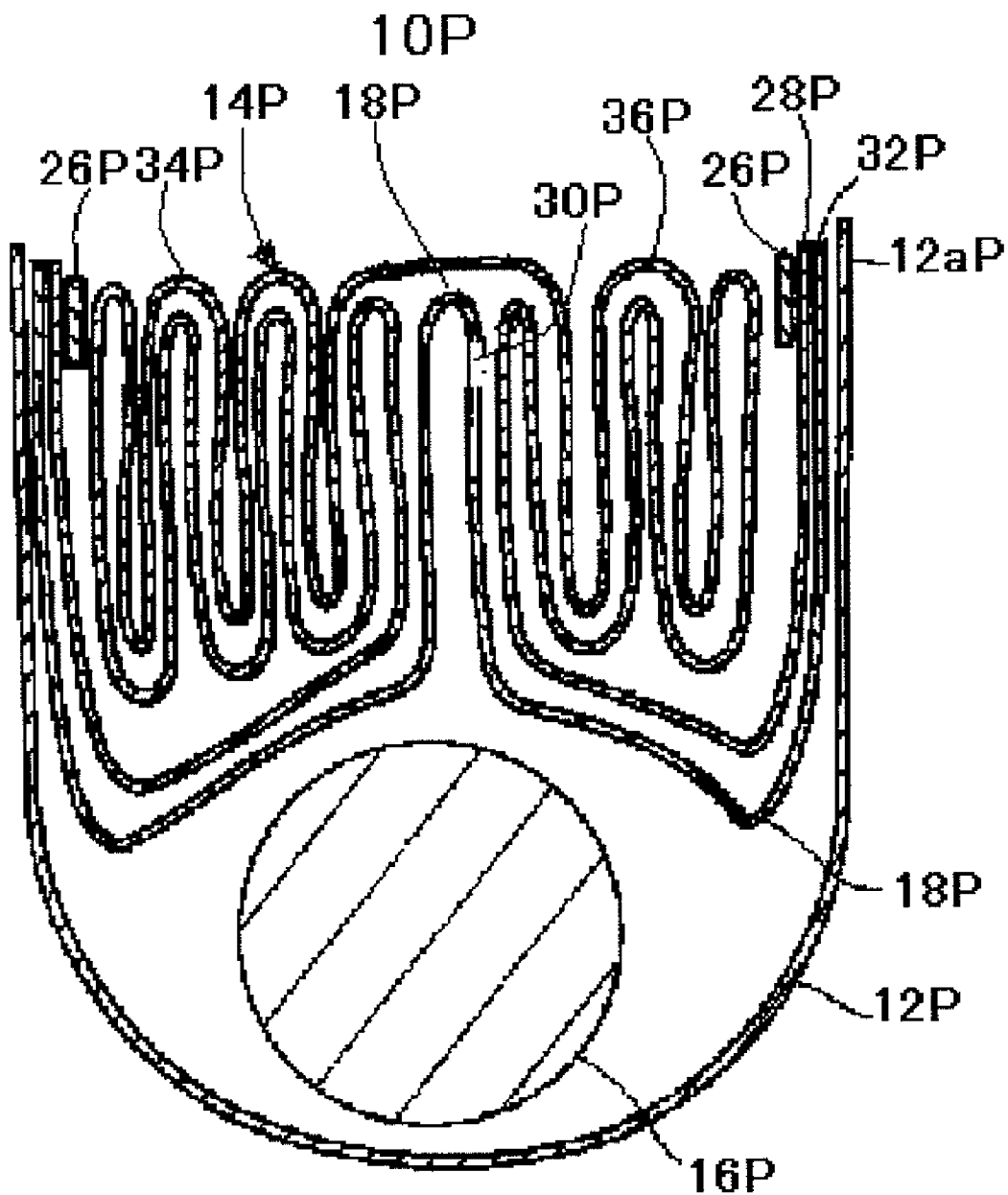
FIG. 28 is a sectional view of a conventional airbag device.
Figure 29:
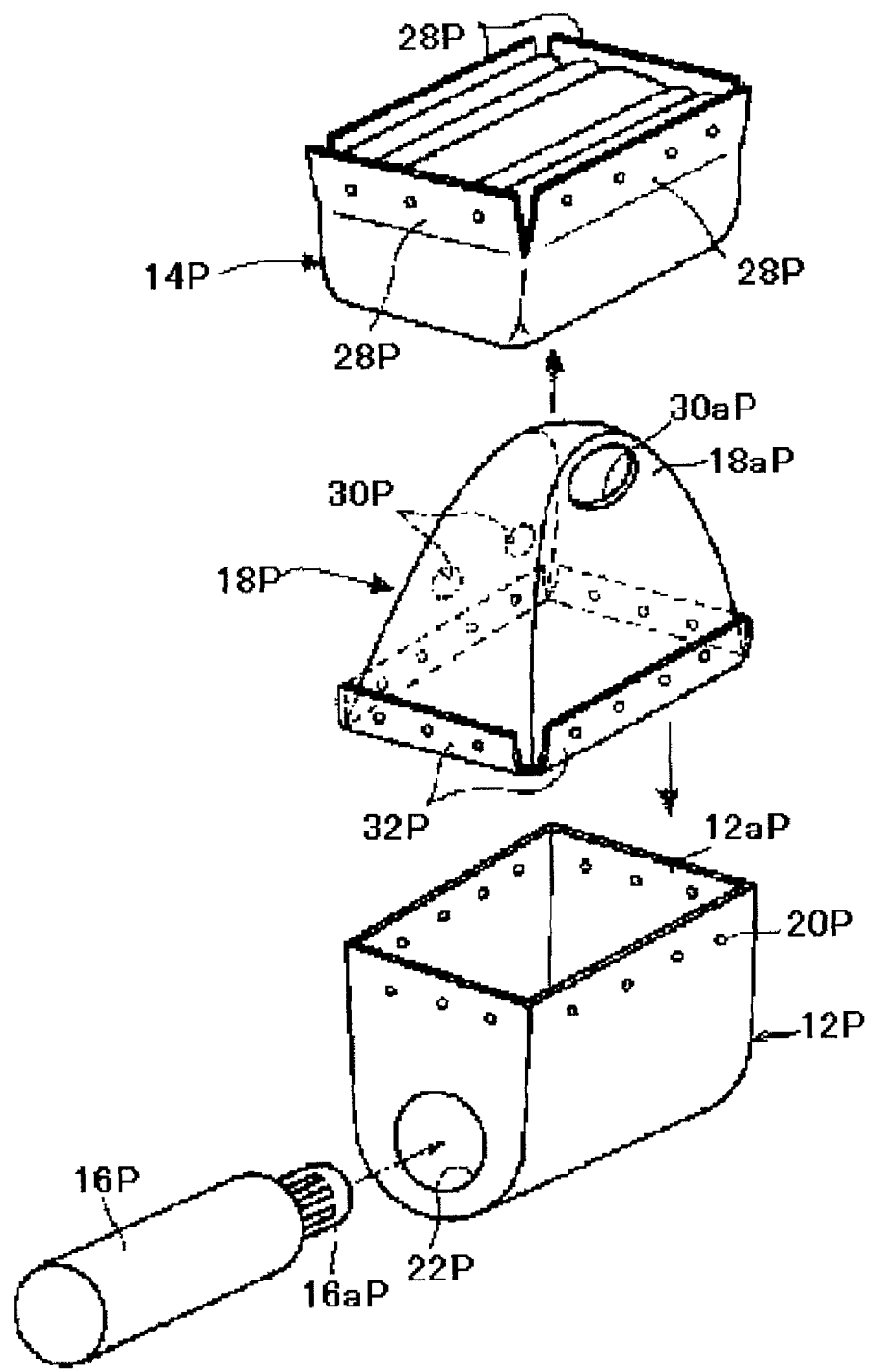
FIG. 29 is an exploded perspective view of the conventional airbag device.

The present embodiment differs from the prior invention in that the holding member 14 of the airbag device M1 of the invention has an anticipated rupture part to be ruptured by a gas pressure at the central portion thereof, whereas the holding member 14R of the airbag device MR of the prior invention has an opening 14Rh at the central portion thereof, however, the other members of the airbag device and the dispositions thereof of the present embodiment are the same as those of the prior invention. That is, the holding member 14 of the invention is clamped between the depressed part 16a of the airbag cover and the connecting member 20 in a state where the folded airbag 10 is enveloped, whereas the depressed part 16a of the airbag cover and a part of the decorative member 40 are inserted into the opening of the holding member 14R (see FIG. 24).

Now, there are described hereinafter respective structures of the base plate 24, the connecting member 20 and the cushion ring 22.

Figure 2:
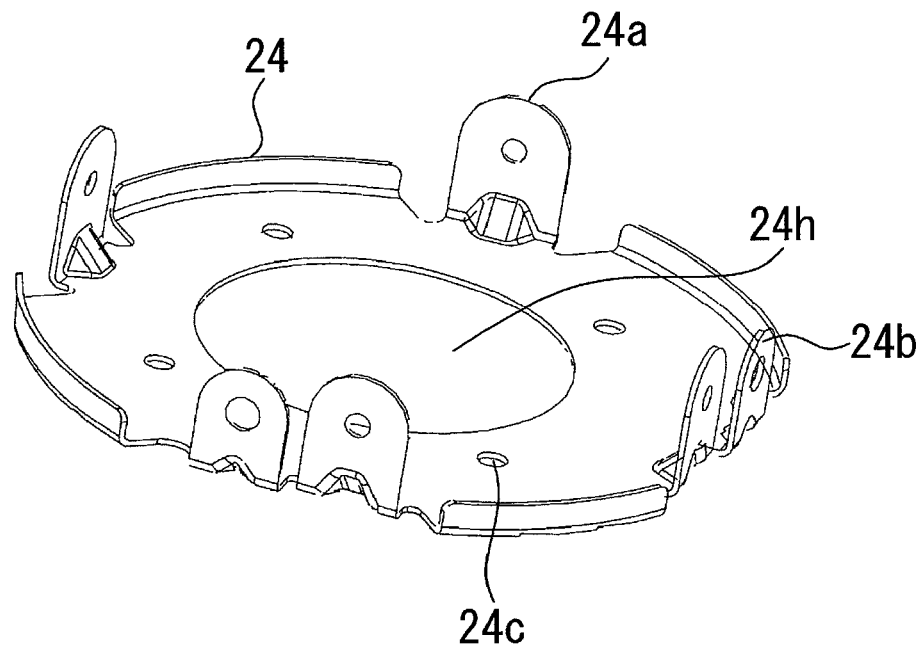
FIG. 2 is a perspective view showing a back surface of a base plate.

FIG. 2 is a perspective view showing the back side of the base plate 24 shown in FIG. 1. The base plate 24 is formed substantially in the shape of a disk, and an opening 24h in which an inflator can be fitted is formed at the central part of the base plate 24, while 4 pieces of airbag cover attachment pieces 24a and a pair of attachment pieces 24b for attachment of the base plate 24 itself are formed in such a way as to be erected from the disk. The base plate 24 is for integrally securing the inflator 30, the airbag 10 and the previously described decorative member 40 with each other, and the pair of the attachment pieces 24b are for securing the base plate 24 to the steering wheel.

The inflator 30 is formed substantially in the shape of a thick disk and is made up so as to exhaust gas upon detection over a predetermined impact. The inflator 30 has an upper portion with a gas exhaust port 30a formed therein penetrating through the opening 24h of the base plate 24 and a flange formed substantially in an intermediate part of inflator 30 in the direction of thickness thereof in close contact with the back side of the base plate 24, thereby being secured together with the cushion ring 22, to the base plate 24 through the attachment holes 24c of the base plate 24. That is, the inflator 30 is secured to the base plate 24 with the gas exhaust port 30a of the inflator 30 disposed on the front side of the base plate 24, so that an exhaust gas from the inflator 30 is exhausted on the front side of the base plate 24.

Figure 3:
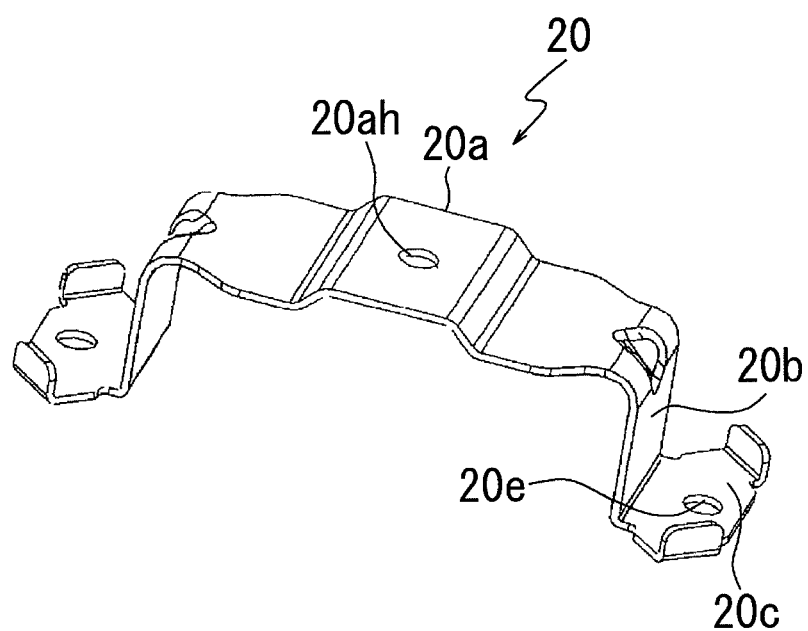
FIG. 3 is a perspective view of a connecting member.

FIG. 3 is a perspective view of the connecting member 20 shown in FIG. 1. The connecting member 20 is made of a metal piece in a sheet-like shape, comprising a central part 20a provided with a hole 20ah in which the attachment bolt 40a is fitted, a leg part 20b formed on each of both sides of the central part 20a bent substantially vertically therefrom, and attachment foots 20c bent substantially right angles to the respective leg parts 20b. Further, each attachment foot 20c is provided with an attachment hole 20e made so as to correspond to the attachment holes 22a of the cushion ring 22 and the attachment holes 24c of the base plate 24, so that both connecting member 20 and the base plate 24 are tightened up each other with bolts 22d formed on the cushion ring 22.

Figure 4A:
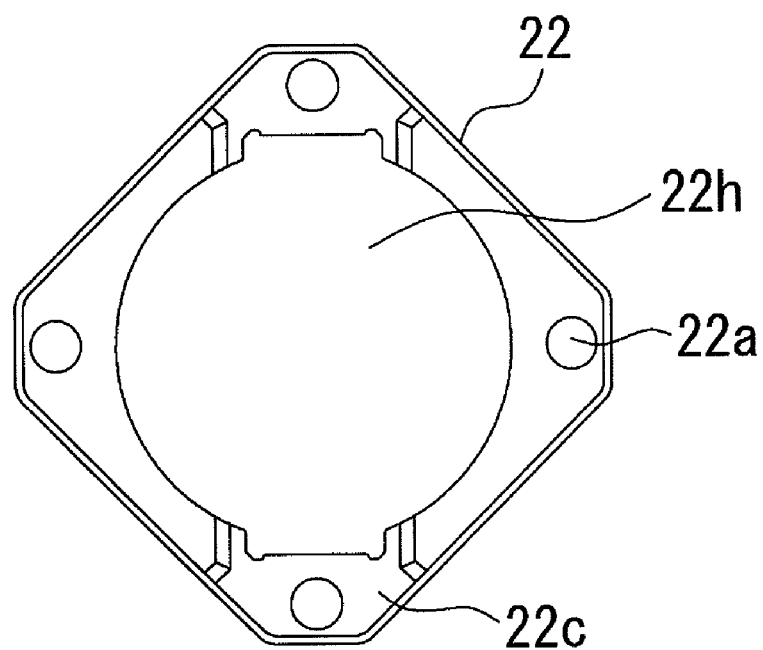
FIG. 4A is a front view of a cushion ring and FIG. 4B is a side view showing a part thereof, in section.
Figure 4B:
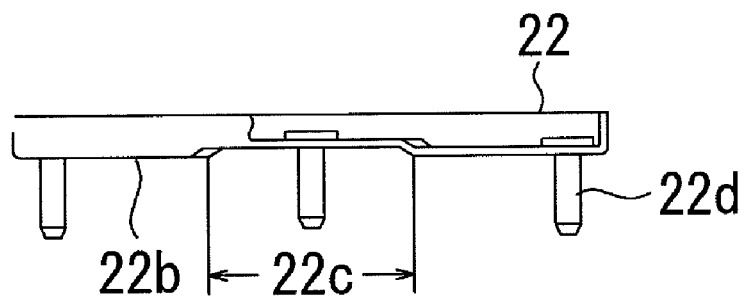

FIG. 4A is a front elevation of the cushion ring 22 shown in FIG. 1, and FIG. 4B is a side view showing a part thereof, in section. As shown in FIG. 4A, the cushion ring 22 is substantially in the shape of a rectangle, a central part thereof is provided with an insertion opening 22h for the inflator 30, and the bolt 22d for attaching the cushion ring 22 to the base plate 24 is provided in respective corners of the cushion ring 22 around the insertion opening 22h on the back side of the cushion ring 22. Further, the back side of the cushion ring 22 constitutes a butting surface 22b that can be butted against the surface of the base plate 24 through the airbag 10 interposed therebetween, the butting surface 22b has a depressed part 22c formed by, for example, drawing work, as is evident from the side view of FIG. 4B. The depressed part 22c is formed so as to have a draw depth substantially equal to a thickness of the attachment foot 20c of the connecting member 20 when the cushion ring 22 is connected with the connecting member 20.

Now, the airbag 10 is described hereinafter with reference to FIGS. 5A, and 5B.

Figure 5A:
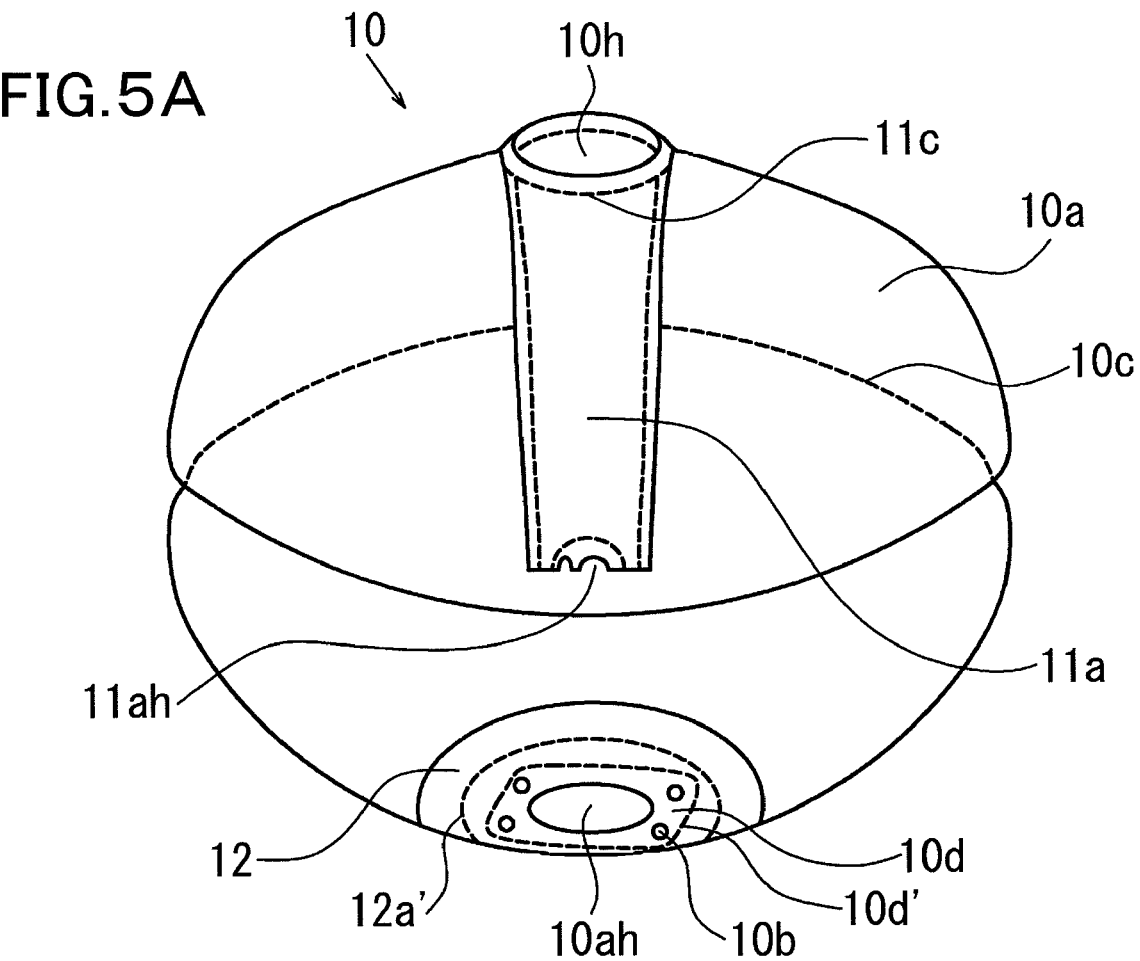
Figure 5B:
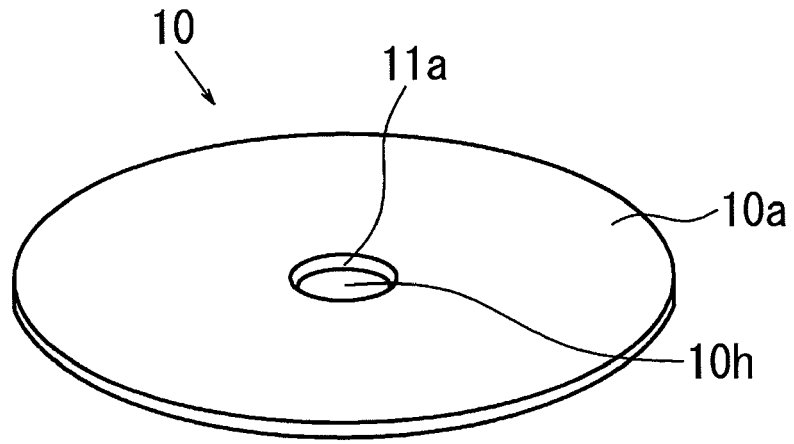
FIG. 5B is a perspective view showing the uninflated airbag.

FIG. 5A is a see-through perspective view showing the interior of the inflated airbag 10, and FIG. 5B is a perspective view showing the un-inflated airbag 10. For brevity, the decorative member 40 inside the tubular tether belt 11a and the inflator 30 joined with the decorative member 40 and so forth are not shown in those figures. The airbag main body 10a is formed in the shape of a bag that is expandable into a flat spherical shape (an ellipsoidal shape) by joining respective outer circumferential edges of two pieces of cloth substantially circular in shape with each other by stitching. A notched part 10h of circular shape for insertion of the depressed part 16a of the airbag cover 16 is formed substantially at the central part of the airbag main body 10a on the front side thereof, and an inflator attachment opening 10ah associating with the inflator for introducing an generated gas into the airbag is formed substantially at the central part of the airbag main body 10a on the back side thereof, while four small holes 10b for insertion of the respective bolts 22d (see FIG. 4B) of the cushion ring 22 are made on the peripheral part 10d around the inflator attachment opening 10ah.

The protective member 12 for protecting the airbag from heat and an impactive pressure generated by the inflator is overlaid on the peripheral part 10d and stitched to a peripheral edge of the inflator attachment opening 10ah of the airbag 10. With the present embodiment, the protective member 12 is also used as a gas rectification member having a function for guiding the gas up to the vicinity of a part of the airbag (a part of the airbag expanding from an anticipated rupture part of the holding member 14 of circular shape) that will inflate in the initial expansion thereof by rectifying a gas flow direction.

As shown in FIG. 5A, the protective member 12 is made of, for example, a woven cloth and is hollow at the center and formed in a concentric circle, and a diameter of the hollow inner circumference thereof is identical in diameter to the inner periphery of the inflator attachment opening 10ah, while an outer circumference thereof is for example at least three times as large in diameter as the inner circumference. When attaching the protective member 12 to the inflator attachment opening 10ah, an inner peripheral edge of the protective member 12 is stitched to an outer circumferential part 10d' of the peripheral part 10d in alignment with the peripheral edge of the inflator attachment opening 10ah and an outer circumferential part 12a' of a concentric circle of the peripheral part 10d. Further, one sheet of the protective member 12 is effective, however, two or more sheets thereof may be adopted, and may be used for the gas rectification member.

The airbag 10 comprises the airbag main body 10a and the tubular tether belt 11a for restricting the extension length of the airbag main body 10a, the airbag main body 10a is provided with a stitched part 10c formed by stitching respective outer peripheral edges of two pieces of base fabrics (a base fabric of the surface portion of the airbag main body and a base fabric of the rear surface portion thereof) substantially circular in shape with each other, and an airbag after stitched is turned inside out, thereby forming the airbag main body in the shape of the bag expandable into the flat spherical shape (the ellipsoidal shape).

As is evident from FIG. 5B, the two pieces of the base fabrics substantially circular in shape are substantially identical in size to each other. The airbag 10 after stretched substantially to a full length in the direction of extension of the thereof as shown in FIG. 5A (upper part of the figure) is folded like bellows with vertically compressed to be contained in the airbag cover 16. At the same time, not only the airbag main body 10a but also the tubular tether belt 11a is folded like bellows in the direction of a tube length thereof. The tubular tether belt 11a when stretched substantially to the full length thereof has a length substantially equal to a length of the front and back base fabric of the airbag main body 10a respectively.

Now, there is described hereinafter a method of folding like bellows with vertically compressed the airbag 10 stretched substantially to the full length thereof in the direction of the extension of the airbag as shown in FIG. 5A (upper part of the figure). For the method of folding like bellows the airbag 10, an airbag-folding machine may be used. FIGS. 6A to 6H are schematic views showing operating process for folding the airbag with the airbag-folding machine. The operating process for folding the airbag will be described hereinafter with reference to those schematic views.

Figure 6A:
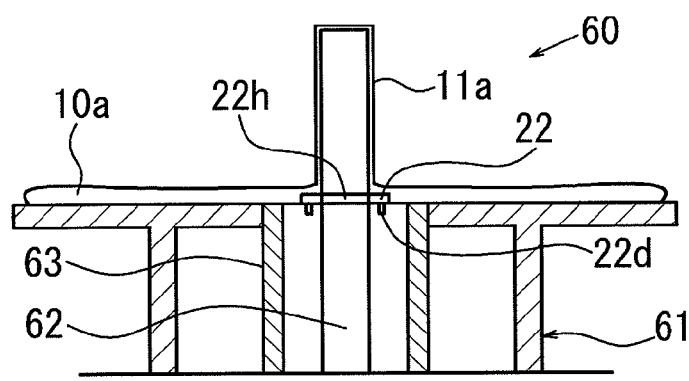
FIGS. 6A-6H are conceptual views showing an operation procedure for folding the airbag.

As shown in FIG. 6A, the airbag-folding machine 60 comprises a table 61 having a support member 62 columnar in shape for supporting the tubular tether belt 11a and an outer cylinder 63 coaxial with the support member 62 for containing the airbag c10 on the outside of the support member 62, and a support unit (not shown) for supporting a clamping member 64 columnar in shape (see FIG. 6C), positioned vertically above the support member 62 and substantially identical in outer diameter thereto, to thereby clamp the upper end of the tubular tether belt 11a between a clamping member 64 and the support member 62. Since the outer diameter of the support member 62 is smaller than the inside diameter of the insertion opening 22h of the cushion ring 22, the support member 62 can be inserted through the insertion opening 22h to thereby ascend as described later.

Further, as shown in FIG. 6A, the bolts 22d of the cushion ring 22 are inserted into the four small holes 10b provided on the peripheral part 10d (see FIG. 5A) of the airbag 10 respectively. The bolts 22d are engaged with four holes provided on the periphery of the support member 62 of the table 61 on the upper end thereof to be secured to the four holes. The head of the support member 62 ascends through the insertion opening 22h to penetrate into a tube portion of the tubular tether belt 11a, outside of the ascended support member 62 the airbag main body 10a is placed flat on the top of the table 61.

Figure 6B:
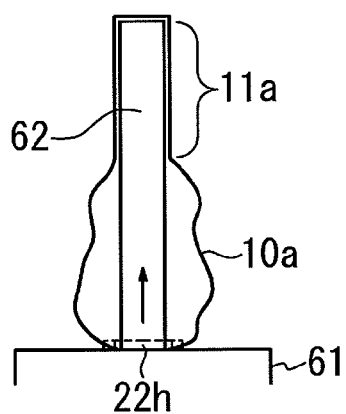

When a lower end of the tubular tether belt 11a is pushed up with the head of the support member 62 inserted into the tube portion of the tubular tether belt 11a through the insertion opening 22h of the cushion ring 22 as shown in FIG. 6A, the airbag main body 10a is also pushed up as shown in FIG. 6B.

As described in the foregoing, since the length of the tubular tether belt 11a is substantially equal to half the length of the airbag main body 10a, the support member 62 ascends to a position at a height at the maximum about three times of the length of the tubular tether belt 11a and stops at the position, whereupon the tubular tether belt is manually passed through a protrusion provided at the tip of the support member 62 through the attachment hole 11ah, thereby implementing positioning of the tubular tether belt 11a.

Figure 6C:
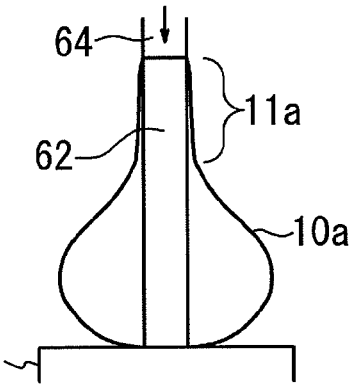

As shown in FIG. 6C, the clamping member 64 descends to clamp said positioned tubular tether belt 11a between the support member 62 and the clamping member 64, the support member 62 and the clamping member 64 descend with the tubular tether belt 11a being kept in clamped position.

Figure 6D:
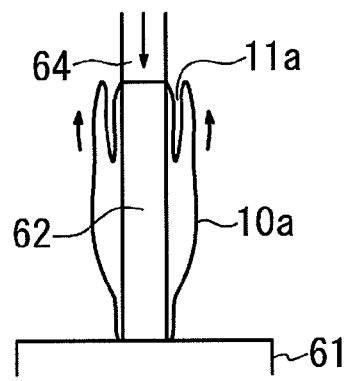

As shown in FIG. 6D, upon the support member 62 and the clamping member 64 descending to a position corresponding to half the length of the tubular tether belt 11a, descending operation is stopped, then the airbag main body 10a placed on the outside is manually pulled up as shown in FIG. 6D. By so doing, the tubular tether belt 11a is folded substantially at an intermediate position thereof.

Figure 6E:
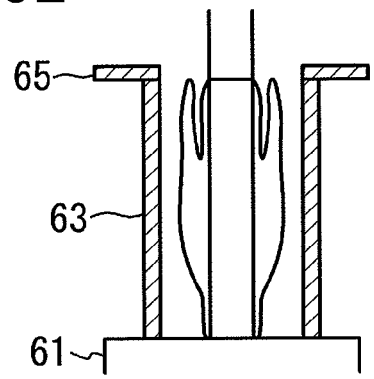
Figure 6F:
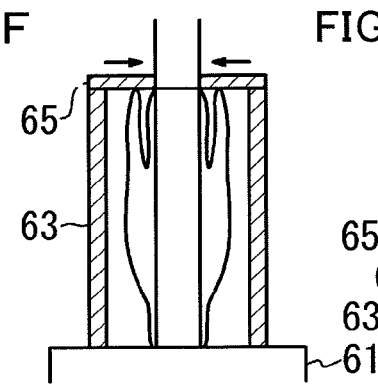

As shown in FIG. 6E, the outer cylinder 63 ascends from the table 61 up to a clamping position of the upper end of the tubular tether belt 11a, thereby containing the airbag 10 between the outer cylinder 63 and the support member 62. As shown in FIG. 6F, with the outer cylinder 63 at that position, two pieces of plates 65, each having a hole bilaterally symmetric and semi-circular in shape, are caused to slide on an upper end of the outer cylinder 63 from the right side and the left side thereof respectively, to be fitted into a fitting groove (not shown) provided at a lower end of the clamping member 64.

Figure 6G:
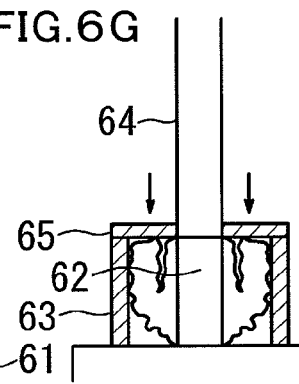
Figure 6H:
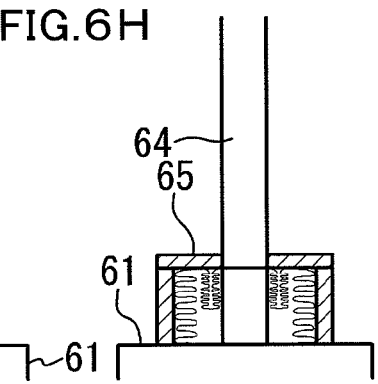

Then, as shown in FIG. 6G, the support member 62, the clamping member 64 and the outer cylinder 63 in keeping that position are caused to concurrently descend, whereupon the folded tubular tether belt 11a overlaid together with the airbag main body 10a will be folded like bellows while being compressed. Upon completion of compression of the airbag 10 (see FIG. 6H), the plates 65 are removed, and subsequently the support member 62, the clamping member 64 and the outer cylinder 63 concurrently revert to respective original positions, thereby completing the operation for folding the airbag 10.

Meanwhile, the length of the airbag 10 has been described in the foregoing as the length of the tubular tether belt 11a is substantially equal to half the length of the airbag main body 10a when the airbag 10 is stretched to the full length thereof, however, it is to be pointed out that the invention is not limited to the length described, and that the respective positions where the support member 62 and the clamping member 64 stop after descending as well as the position where the support member 62 stops may be decided depending on a length of the airbag 10.

Figure 7A:
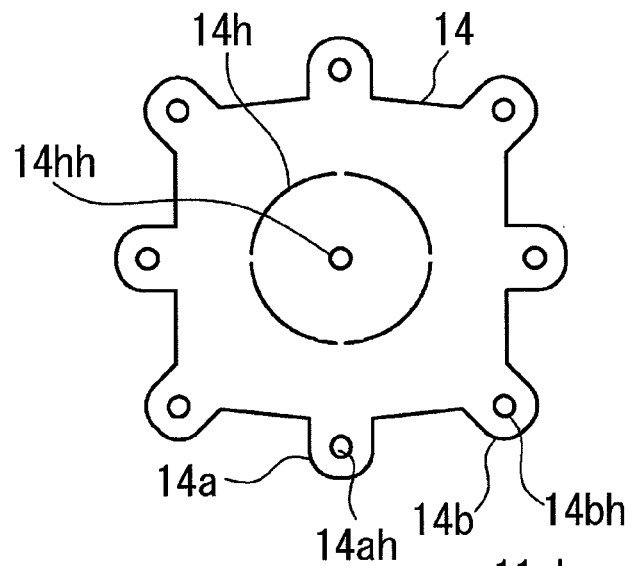
FIG. 7A is an expansion view of a holding member according to a first embodiment.

FIG. 7A is an expansion view of the holding member 14 prior to covering the airbag 10 according to the first embodiment of the invention. The holding member 14 is made of a woven cloth and approximate square in shape, and an attachment bolt insertion hole 14hh circular in shape is provided at the center thereof while eight holes 14ah, 14bh, to be engaged with the bolts 22d of the cushion ring 22 are provided at the respective centers of four sides, and at respective corners along diagonal lines of the approximate square. As described later in detail, the attachment bolt insertion hole 14hh of the holding member 14 is a hole for use in insertion of the attachment bolt 40a shown in FIG. 1, when the airbag 10 covered with the holding member 14 is accommodated in the airbag cover 16. Reference numeral 14h denotes the anticipated rupture part of the holding member 14, substantially circular in shape, formed by perforations, and the anticipated rupture part 14h is provided in order to facilitate rupture in the initial stage of expansion of the airbag. A size of the anticipated rupture part 14h is sufficient to be larger than the diameter of the depressed part 16a of the airbag cover 16. The perforations of the rupture part substantially circular in shape are long in cut lines and short in joints, and the joints are formed at the positions where the rupture part substantially circular in shape is quartered.

Meanwhile, if the size of the anticipated rupture part is larger than the diameter of the decorative member 40, the cylindrical tether belt 11a as folded does not contact the decorative member 40 in the initial stage of expansion of the airbag, and can expand smoothly.

Figure 7B:
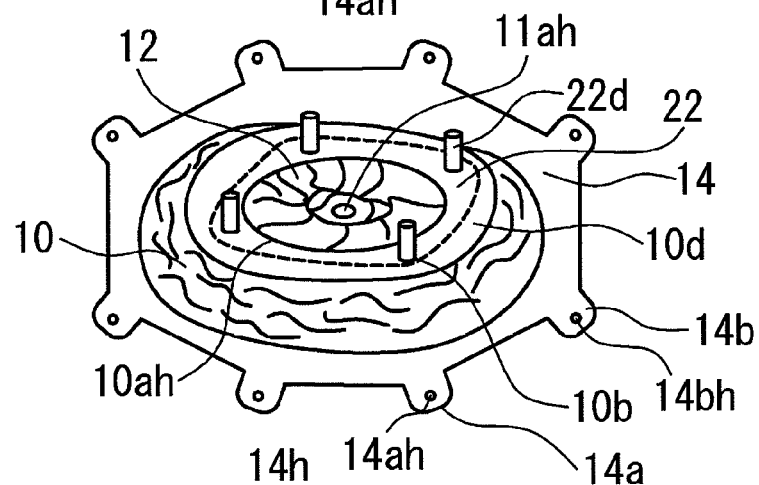
FIG. 7B is a perspective view showing the back side of the folded airbag.

FIG. 7B is a perspective view showing the back side of the holding member 14 prior to covering the airbag 10 and the back side of the airbag 10 as folded by the airbag-folding machine 60 previously described. The four holes 14ah at the respective centers of four sides of the holding member 14 are engaged with the bolts 22d of the cushion ring 22 protruding from the folded air bag 10, respectively. Thereafter, the holes 14bh positioned on the respective diagonal lines are all engaged with two bolts 22d positioned opposite to each other. When engaging these components, since the joints of the perforations of the anticipated rupture part are located at positions to be pulled out for engaging bolts 22d to the holes 14ah at centers of the four sides, the engagement state at four spots is kept balanced.

Figure 7C:
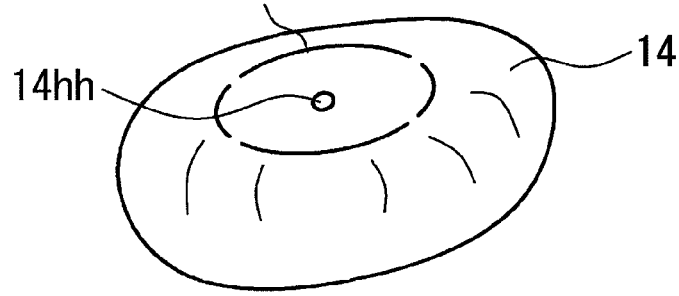
FIG. 7C is a perspective view showing the airbag covered with the holding member.

FIG. 7C is a perspective view showing a state in which the folded airbag 10 is covered with the holding member 14. When covering the airbag 10 with the holding member 14, the airbag 10 is covered such that the attachment hole 11ah of the tubular tether belt 11a shown in FIG. 6A, overlies the attachment bolt insertion hole 14hh of the holding member 14. The airbag is covered completely by the holding member 14 within the anticipated rupture part 14h.

Figure 7D:
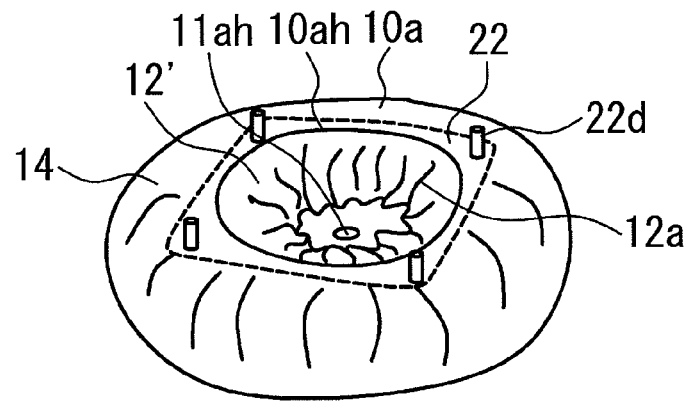
FIG. 7D is a backside view of the airbag covered with the holding member.

FIG. 7D is a backside view of the airbag 10 covered with the holding member 14 shown in FIG. 7C. As the protective member 12 is folded like bellows inside the airbag 10 as folded, the same is once pulled out to be thereby disposed along the inner periphery of the airbag 10 as folded shown in FIG. 7D (or FIG. 1). By so doing, the protective member 12 carries out the function as the gas rectification member. A part of the protective member 12, which is once pulled out to be thereby disposed along the inner periphery of the airbag 10 as folded shown in FIG. 7D (or FIG. 1), is hereinafter referred to as a gas rectification member 12'. Further, by covering the airbag 10 with the holding member 14, the attachment hole 11ah of the tubular tether belt 11a overlying the attachment bolt insertion hole 14hh is disposed substantially at the center of the inflator attachment opening 10ah of the airbag 10, in other words, substantially at the center of the gas rectification member 12' formed up to the vicinity of the part of the airbag inflating in the initial stage of expansion thereof. The foregoing gas rectification member 12' attached to the inflator attachment opening 10ah, in a state as held by the holding member 14 as shown in FIG. 7D, has a surface with multiple-folded pleats 12a formed thereon.

Meanwhile, with the airbag 10 held by the holding member 14, and contained in the airbag cover 16, the gas rectification member 12' is extended along the inner wall of the airbag 10 toward the front side from the cushion ring 22 clamping the inflator attachment opening 10ah of the airbag 10 up to the vicinity of the tip of the folded tubular tether belt 11a, the part of the airbag that will inflate in the initial expansion thereof, as shown in FIG. 1. The gas rectification member 12' in this state is tubular in shape. Since the multiple-folded pleats 12a are formed on the surface of the gas rectification member 12', as described above, the gas rectification member 12' has an advantageous effect as the protective member for protecting the periphery of the inflator attachment opening 10ah of the airbag 10 from heat and impact of gas pressure, and further has the function as the rectification member for rectifying the gas since the protective member 12 is tubular in shape.

The bolts 22d of the cushion ring 22 inserted when folding the airbag 10 are shown as protruded outside of the airbag at the peripheral edge of the inflator attachment part, on the backside of the airbag 10. As a result of covering the airbag 10 with the holding member 14 structured as above, a side face of the airbag 10, on the outer circumference thereof, is pressed down, so that it is possible to restrain the inflation and expansion of the airbag 10 in the direction of the side face thereof, caused by the gas generated from the inflator in the initial expansion of the airbag 10.

With the first embodiment, the airbag device provided with horn switch using a pyro-type inflator is described, and next there is described a holding member of an airbag device with a hybrid-type inflator or a stored-type inflator.

Figure 8A:
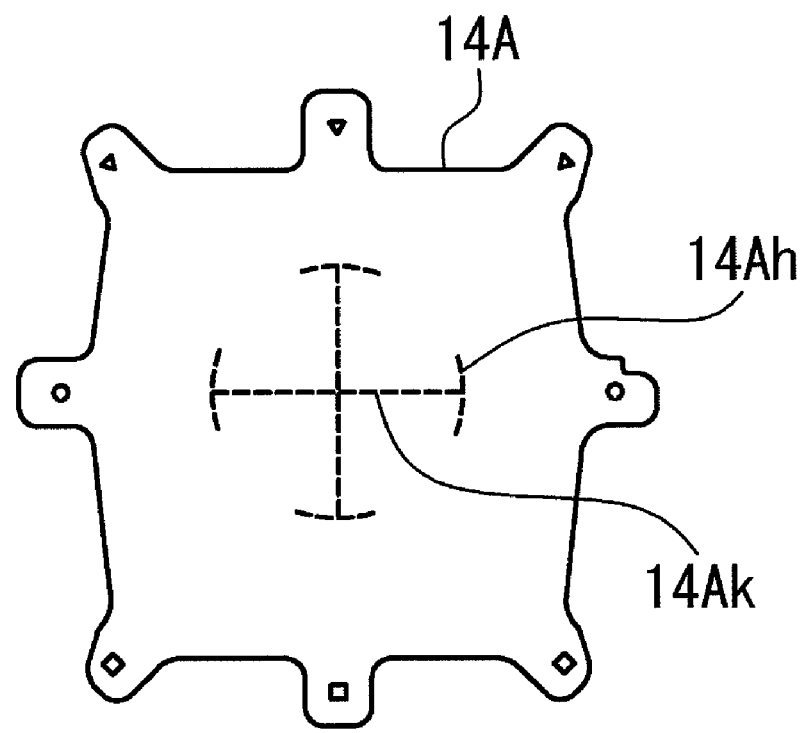
FIGS. 8A and 8B are expansion views of a holding member according to a second embodiment.

FIG. 8 is an expansion view of a holding member according to a second embodiment. A holding member 14A in FIG. 8A is made of a woven cloth in the shape of an approximate square like the holding member 14 of the first embodiment, and a reference numeral 14Ah is a rupture stop part in the shape of a part of a perforated approximate circle provided in the holding member 14A, and an anticipated rupture part 14Ak in the shape of a perforated cross are formed side to side and up and down and directed toward the holes provided at centers of four sides from the center of the rupture stop parts substantially circular in shape.

The perforations are formed such that the cut lines and joints are substantially the same and short in length. The rupture stop part 14Ah formed of a part of the circle prevents the holding member 14A from being cut beyond the cross perforations of the anticipated rupture part, and the part of the airbag inflating in the initial stage of the expansion thereof facilitates the expansion, when the anticipated rupture part 14Ak is ruptured in the initial stage of the expansion of the airbag.

Figure 8B:
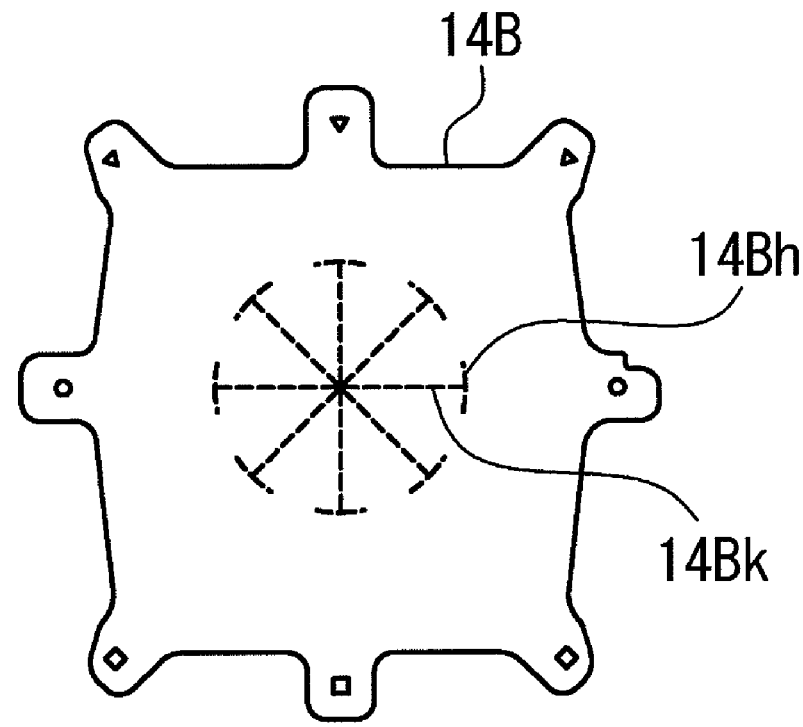

FIG. 8B is an expansion view of another holding member 14B according to the second embodiment. The holding member 14B has the same shape as the holding member 14A, described as above, except that the number of the perforations parts of the anticipated rupture part 14Bk and rupture stop parts 14Bh is respectively increased from 4 to 8 relative to the holding member 14A. The expansion velocity of the part of the airbag inflating in the initial stage of the expansion thereof, is increased when the number of the anticipated rupture part 14Ak is increased.

Figure 9A:
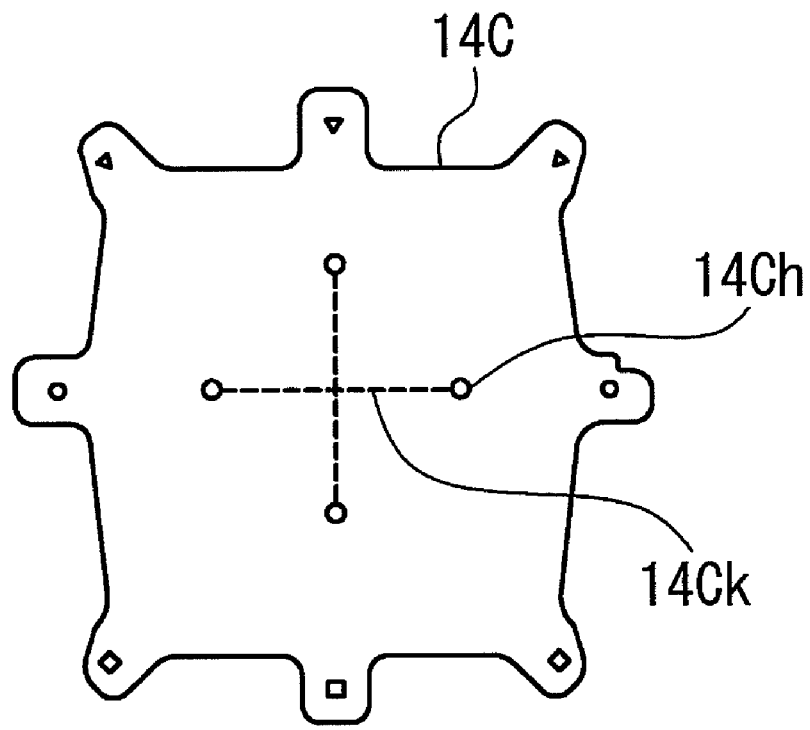
FIGS. 9A and 9B are expansion views of a holding member according to a third embodiment.

FIG. 9A is an expansion view of a holding member 14C according to a third embodiment. The holding member 14C has the anticipated rupture part 14Ck formed of perforations in the shape of a cross formed side to side and up and down from the center thereof, and small holes 14Ch are formed on the holding member 14C instead of the rupture stop part 14Ah of the holding member 14A. The small holes 14Ch prevent the holding member 14C from being cut beyond the perforations like the same function as the rupture stop part 14Ah.

Figure 9B:
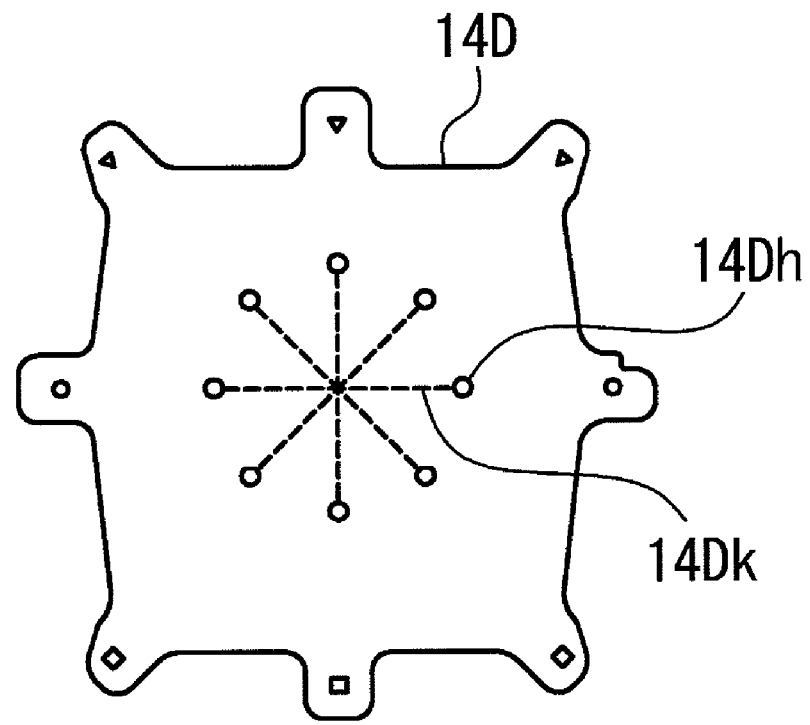

FIG. 9B is an expansion view of another holding member 14D according to a third embodiment. The holding member 14D has the same shape as the holding member 14C except that the number of the perforations parts of anticipated rupture parts 14Dk and rupture stop parts 14Dh are increased from 4 to 8 relative to the holding member 14C. An expansion velocity of the part of the airbag inflating in the initial stage of the expansion thereof is increased when the number of the anticipated rupture parts 14Dk is increased.

Although there were explained that the anticipated rupture parts of the holding members of the second and third embodiments are cross in shape and have 8 pieces in radial shape, the invention is not limited to this shape and they are sufficient to be radial in shape relative to the center of the holding member and determined in shape depending on the type of the inflator, volume of gas and so forth.

FIG. 10 is an expansion view of a periphery-protective member 70 for protecting the peripheral part 10d provided around the inflator attachment opening 10ah. The periphery-protective member 70 is made of a woven cloth, and a surface thereof is coated with a silicone rubber. The periphery-protective member 70 is substantially circular in shape, an insertion opening 70ah for use in insertion of the inflator 30 is provided in a central region thereof, and four holes 70b through which the bolts described as above are inserted respectively, are provided along a circumference outside the insertion opening 70ah. The periphery-protective member 70 is provided in order to prevent the peripheral part 10d of the inflator attachment opening 10ah from being damaged by an edge of the connecting member 20 when the connecting member 20 is fitted on the reverse side of the cushion ring 22, and the airbag 10 is clamped between both the members 20, 22 to be thereby secured.

In describing a process for covering the airbag 10 with the holding member 14, shown in FIG. 7B, description of the periphery-protective member 70 is omitted, however, prior to engagement of the bolts 22d with the holes 14ah positioned at the respective centers of the four sides, to be engaged with the bolts 22d respectively, the holes 70b of the periphery-protective member 70 are fitted onto the bolts 22d before placement of the periphery-protective member 70, and subsequently, the airbag 10 is covered with the holding member 14.

If the protective member 12 is made of a woven cloth as in the case of the airbag 10, it need only be sufficient to dispose cylindrically the protective member 12 prepared by overlaying cloth of a predetermined width on the peripheral part 10d around the inflator attachment opening 10ah to be thereby stitched therewith. The protective member 12 needs to have a length reaching the vicinity of the part of the airbag 10 that will inflate in the initial expansion thereof, preferably a length reaching, for example, the tip of the folded tubular tether belt 11a.

For a material of the protective member 12, material other than a material of the airbag 10, for example, a synthetic resin sheet, and any flexible material capable of carrying out the function for rectifying gas can be used. In such a case, it need only be sufficient to securely attach the airbag 10 and the synthetic resin sheet together by appropriate means. Further, it is also possible to carry out the invention with the protective member 12 made as a separate member without securely attaching to the airbag 10. If the protective member 12 is the separate member, the protective member 12 is not limited to the synthetic resin sheet, and may be one made of metal. In such a case, it need only be sufficient to rectify the gas generated from the inflator to flow only toward the part of the airbag that will inflate in the initial expansion thereof. The protective member 12 may be either integrally joined with the bolts 22d of the cushion ring 22, or may be attached as a member completely separated therefrom. Otherwise, the protective member 12 may be welded to the base plate 24, or may be formed by deep drawing.

Subsequent assembling work for the airbag device M1 is the same as the work described in the foregoing. As previously described, the protective member 12 needs to have the length reaching the vicinity of the part of the airbag 10 that will inflate in the initial expansion thereof, preferably the length reaching, for example, the tip of the folded tubular tether belt 11a.

There is described another embodiment of a gas rectification member which is different from that formed on the holding member, described as above.

Figure 11:
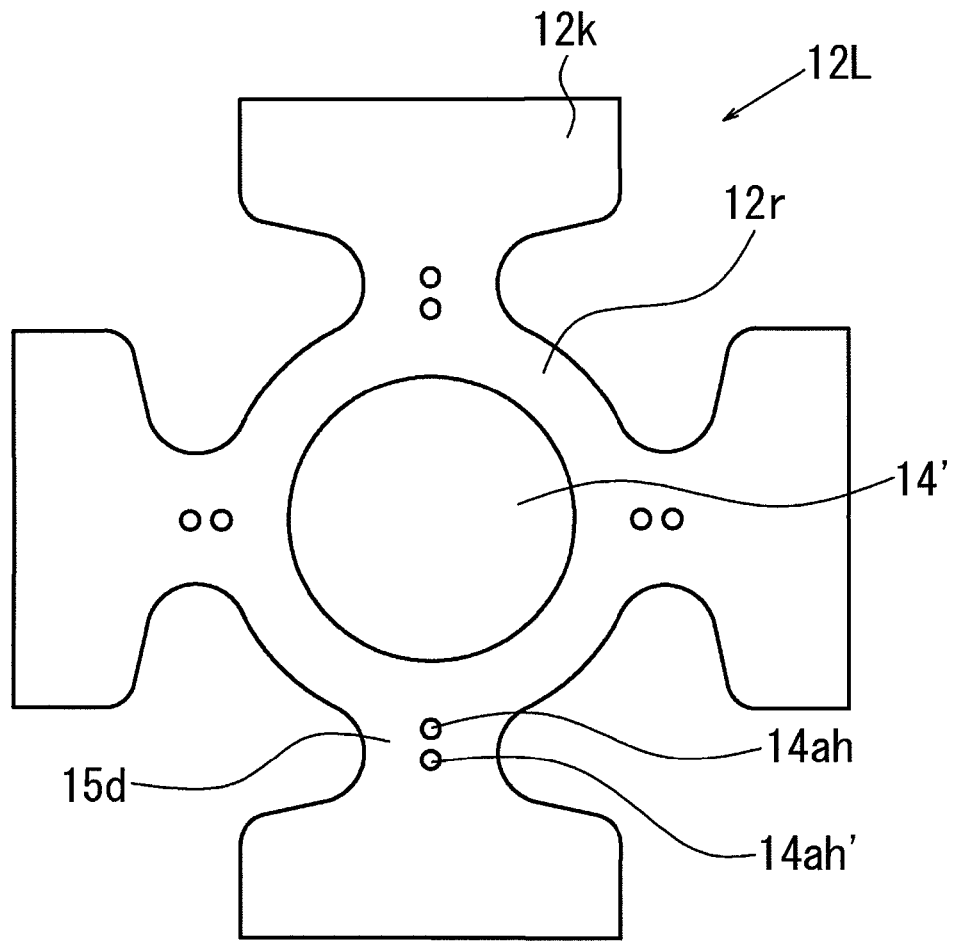
FIG. 11 is an expansion view of a gas rectification member according to the first embodiment.

FIG. 11 is an expansion view of a gas rectification member 12L according to the present embodiment. The gas rectification member 12L is made of a woven cloth and formed of the same material as the airbag. The gas rectification member 12L comprises attachment parts 15d, having holes 14ah through which the bolts 22d of the cushion rings 22 penetrate and four holes 14ah' positioned outside the holes 14ah in the vicinity thereof, and gas rectification pieces 12k in the shape of a comb which are continued from the attachment parts 15d, which are formed at the positions where the outer circumference of ring shaped part 12r is quartered, and an opening 14' having substantially the same size as the inflator attachment opening 10*ah* of the airbag 10 is formed at the central portion of the ring shaped member 12*r*.

The gas rectification member 12L is overlaid on the holding member 14 after the holding member 14 is attached to the airbag 10. That is, the holding member 14 is overlaid on the bolts 22*d* of the cushion ring 22 which protrude by penetrating the airbag 10 and holding member 14, and the bolts 22*d* are inserted into the holes 14*ah* of four attachment parts 15*d* of the gas rectification member 12L to be retained thereby, subsequently the gas rectification pieces 12*k* are folded back to insert the bolts 22*d* into outside four small holes 14*ah*' so that the gas rectification pieces 12*k* are stretched and disposed along the inner circumference of the airbag 10.

Then the airbag 10 to which the gas rectification member 12L is attached is accommodated in the airbag cover 16, subsequently two opposite bolts of the protruded bolts 22*d* are fitted in the attachment openings 22*a* of a pair of attachment legs 20*c* of the connecting member 20, and in this state, the bolts 22*d* are further fitted in the attachment holes 24*b* of the base plate 24, thereafter a nut is screwed with the bolts 22*d* from the back side of the base plate 24, so that the connecting member 20, the cushion ring 22, the airbag 10, the holding member 14 and the gas rectification member 12L are fastened together, to be integrally connected to one another. Meanwhile, if the holding member 14 is not used, the gas rectification member 12L overlaid on the airbag 10 is retained by and attached to the cushion ring 22.

In such a manner, the gas rectification member 12L can be disposed at substantially the center of the airbag 10 with ease, and the gas rectification member 12L thus disposed can introduce the gas from the inflator 30 into the part of the airbag 10 inflating in the initial stage of expansion thereof.

Figure 12:
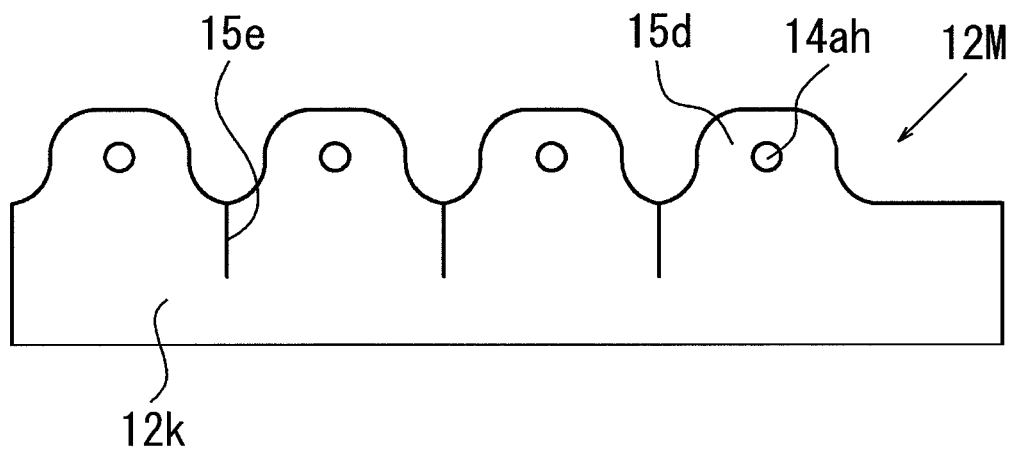
FIG. 12 is an expansion view of a gas rectification member according to the second embodiment.

FIG. 12 is an expansion view of a gas rectification member 12M according to the second embodiment. The rectangular gas rectification member 12M comprises a gas rectification piece 12*k* having a function to rectify a gas from the inflator 30 described as above at its lower portion, and attachment parts 15*d* at its upper portion for retaining the gas rectification piece 12*k* by bolts 22*d* of the cushion ring 22 described as above, wherein the attachment parts 15*d* have holes 14*ah* for engagement with the bolts 22*d* at its center and cut grooves 15*e* are formed between the attachment parts 15*d*. A horizontal width of the gas rectification member 12M is made up to be longer than an inner circumference of the airbag when the gas rectification piece 12*k* is disposed inside the folded airbag.

When the gas rectification member 12M is attached to the airbag 10 in a state as folded and held by the holding member 14, the holes 14*ah* of the attachment parts 15*d* of the gas rectification member 12M, shown in FIG. 12, are sequentially engaged with the bolts 22*d* of the cushion ring 22 from the left side, and the gas rectification pieces 12*k* are overlapped one another at the portion of the cut grooves 15*e* and stretched and disposed along the inner circumference of the airbag 10.

Meanwhile, although the right end portion of the gas rectification member 12M, shown in FIG. 12, is extended long, when the gas rectification member 12M is caused to line along the inner circumference of the airbag, the length of the gas rectification member 12M at the right and left end portions can be optionally determined if there is a region where the gas rectification piece 12*k* at the left end portion and the gas rectification piece 12*k* at the right end portion are overlaid on one another.

Figure 13:
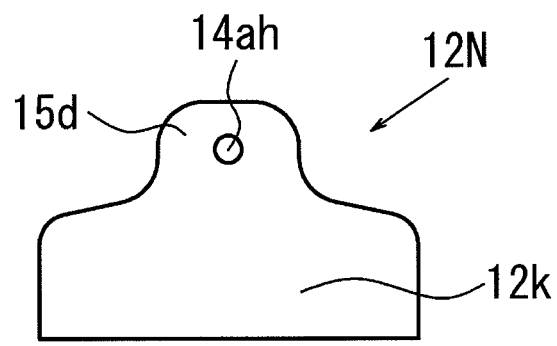
FIG. 13 is an expansion view of a gas rectification member according to the third embodiment.

FIG. 13 is an expansion view of another gas rectification member 12N according to the third embodiment. The gas rectification member 12N is structured by 4 pieces of independent gas rectification members having the same shapes, and the lower part thereof forms a gas rectification piece 12*k* having a function to rectify a gas from the inflator 30 and the upper part thereof forms an attachment part 15*d* for attaching the gas rectification piece 12*k* to the bolt 22*d* of the cushion ring 22. A hole 14*ah* through which the bolt 22*d* is inserted is formed at the center of the attachment part 15*d*.

When the gas rectification member 12N is attached to the airbag 10 held by the holding member 14, the gas rectification pieces 12*k* are caused to engage with the bolts 22*d* of the cushion ring 22 one by one, then they are stretched and disposed along the inner circumference of the airbag 10. Also in the gas rectification member 12N, when the gas rectification pieces are disposed inside the airbag 10 as folded, the lengths of gas rectification pieces in the peripheral direction are set to be longer than an inner circumference of the airbag in order to be overlaid on one another.

Figure 14:
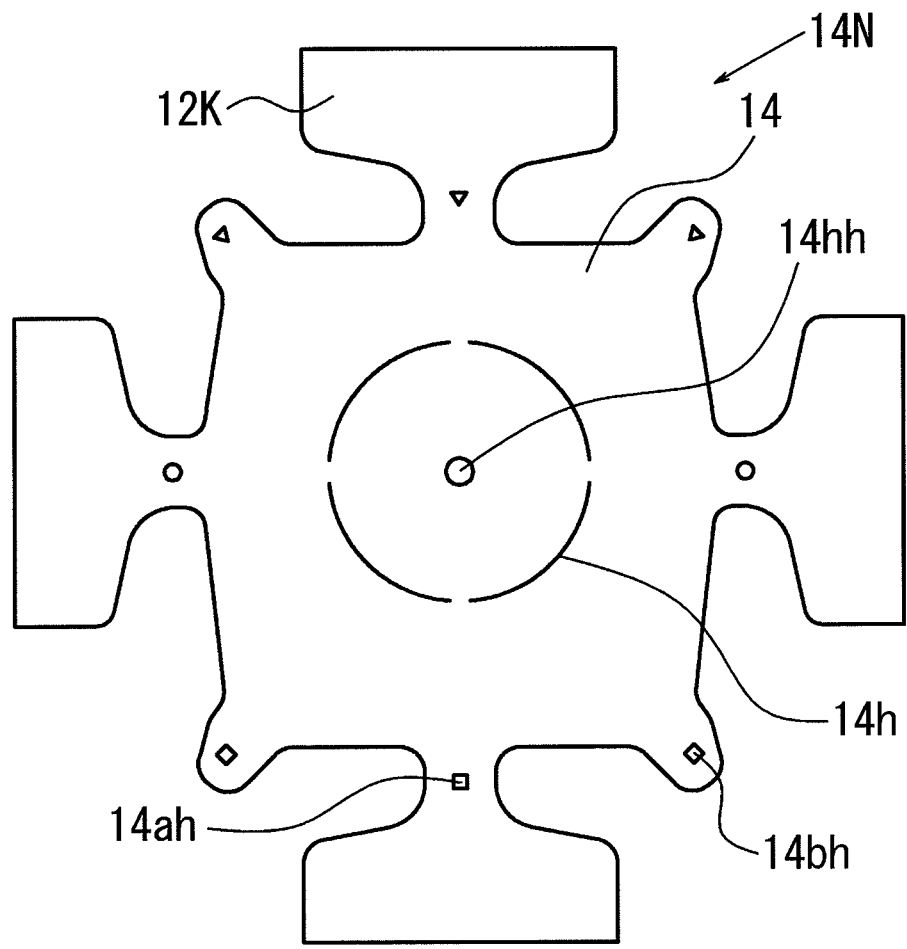
FIG. 14 is an expansion view of a gas rectification member according to a fourth embodiment.

FIG. 14 is an expansion view of a gas rectification member 14N according to a fourth embodiment. The gas rectification member 14N is formed integrally with a holding member. The gas rectification member 14N is made of a woven cloth, in the same way as respective embodiments of the invention, described as above, and is provided with comb-shaped gas rectification pieces 12*k* at the centers of four sides in the shape of the approximate square, and an attachment bolt insertion hole 14*hh* circular in shape is provided at the center thereof while eight holes 14*ah*, 14*bh*, to be engaged with the bolts 22*d* of the cushion ring 22, are provided at the centers of four sides in the shape of the approximate square, and at corners along diagonal lines thereof.

The attachment bolt insertion hole 14*hh* of the gas rectification member 14N integrated with the holding member 14 is provided to be inserted by the attachment bolt 40*a* like the attachment bolt insertion hole 14*hh* of the holding member 14 (cf. FIG. 7). The horizontal width of the gas rectification piece 12*k* is not less than a quarter of the inner periphery of the airbag 10 as folded, and the depth thereof is shorter than the height of the airbag 10 as folded from the hole 14*ah*.

Reference numeral 14*h* denotes a rupture part formed by perforations, like the rupture part substantially circular in shape, provided on the holding member as shown in FIG. 7A, and the rupture part 14*h* is provided to facilitate rupture in the initial stage of expansion of the airbag, a size of the rupture part 14*h* being sufficient to allow respective diameters of the depressed part 16*a* of the airbag cover 16, and the decorative member 40 to pass therethrough. The perforations in the rupture part substantially circular in shape are long in cut grooves and short in joints, and the joints are formed at the positions where the rupture part substantially circular in shape is quartered.

Figure 15:
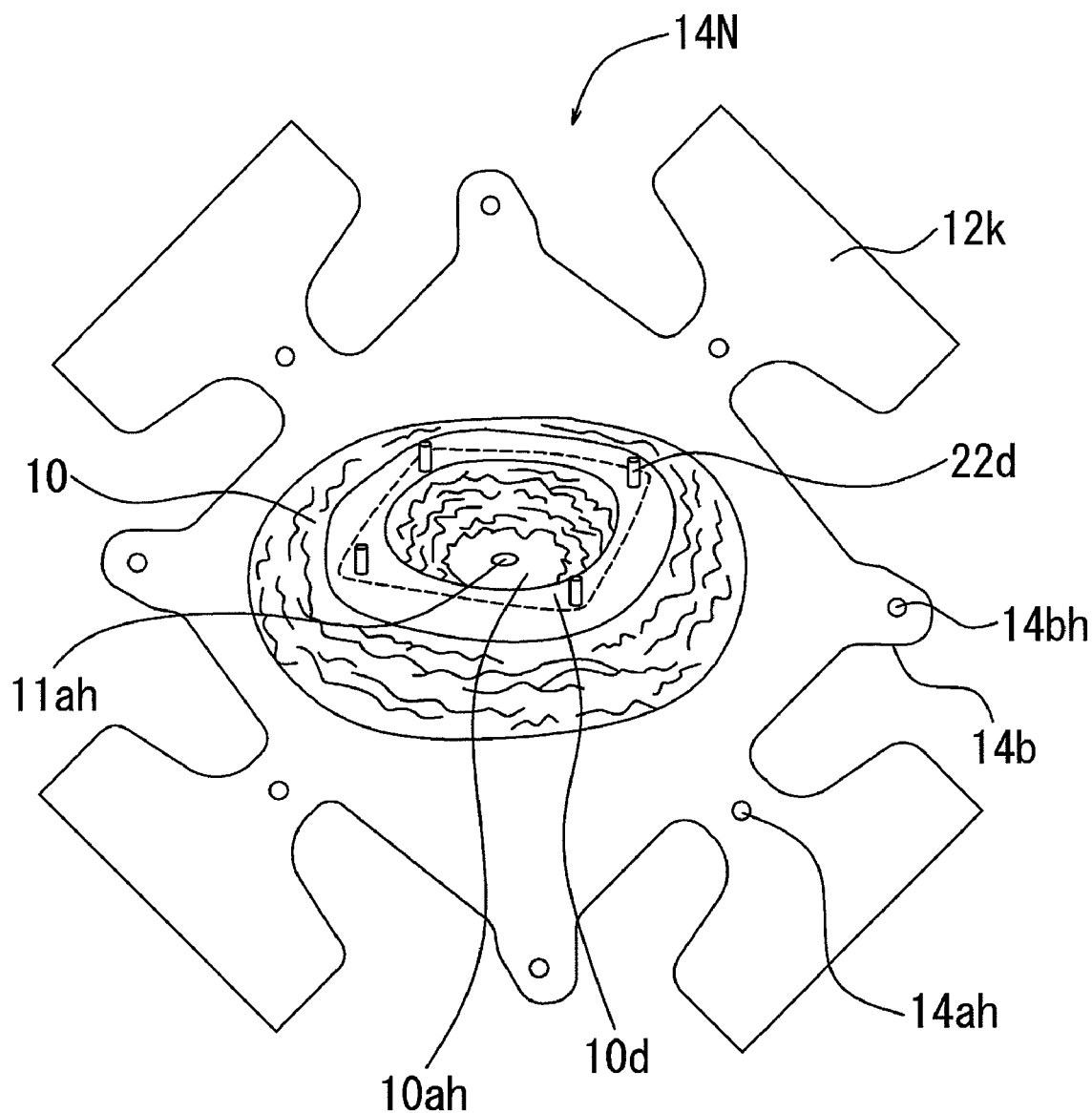
FIG. 15 is a view showing the back side of the gas rectification member and the folded airbag prior to covering the airbag according to the fourth embodiment.

FIG. 15 is a back side view of the gas rectification member 14N integrated with the holding member before enveloping the airbag 10 and the airbag 10 as folded by an airbag-folding machine 60 described later.

As shown in FIG. 15, the airbag 10 is folded and placed on the holding member, subsequently the peripheral edge part of the holding member is lifted, the comb-shaped gas rectification pieces 12*k* which are positioned opposite to the two bolts 22*d* of the cushion ring 22 which are protruded from the peripheral portion 10*d* of the inflator attachment opening 10*ah* of the airbag 10 and opposed to each other, are folded back, and the two bolts 22*d* are fitted in the holes 14*ah* of the gas rectification pieces 12*k*, then the comb-shaped gas rectification pieces 12*k* are stretched along the inner periphery of the airbag 10, while in the same manner, other two bolts 22*d* are fitted in the other two holes 14*ah*, then the comb-shaped gas rectification pieces 12*k* are stretched along the inner periphery of the airbag 10. Thereafter, the bolts 22*d* positioned opposite to the holes 14*bh* which are positioned at the diagonal line are fitted in all the holes 14*bh*. When fitting the bolts 22*d* in the holes 14*bh*, the joints of the perforations of the rupture part 14*h* are positioned on the lines for connecting the holes 14*ah* which are positioned at the centers of the four sides, a pull force generated when fitting the bolts 22*d* in the holes 14*bh* acts on the joints so that fitting state at four spots is kept balanced.

Figure 16:
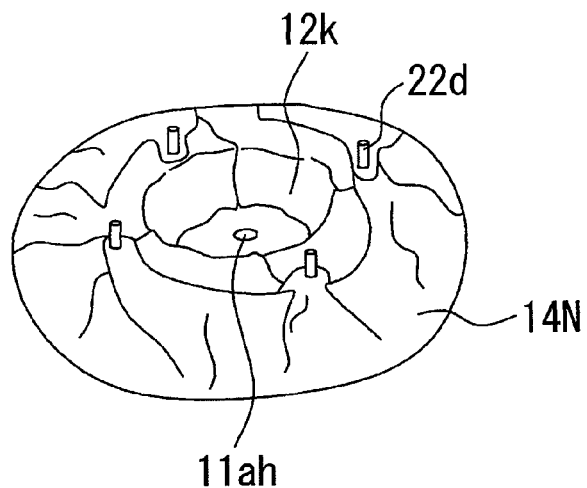
FIG. 16 is a perspective view of the back side of the airbag covered with the gas rectification member according to the fourth embodiment.

FIG. 16 is a perspective view of the back side of the airbag 10 covered with the gas rectification member 14N integrated with the holding member. The comb-shaped gas rectification pieces 12*k* are expanded and disposed along the inner periphery of the airbag 10. Since the horizontal width of the comb-shaped gas rectification piece 12*k* has a length not less than a quarter of the inner periphery of the airbag 10, the gas rectification pieces 12*k* are stretched along the inner periphery of the airbag 10 in a state where parts of the gas rectification pieces 12*k* are overlapped with one another. Described as above, the gas rectification member 14N needs to have the length to reach up to the vicinity of the part of the airbag inflating in the initial stage of expansion thereof, preferably a length reaching, for example, the tip end of the tubular tether belt 11*a* as folded.

With the gas rectification members according to the first to fourth embodiments, although the gas rectification members for the airbag device M1 provided with the horn switch using the disk type inflator were explained, it is possible to obtain the same effect even if the gas rectification member 12 (12L, 12M and 12N, 14N) is used for the gas rectification member for the airbag device using the cylinder type inflator.

Figure 17:
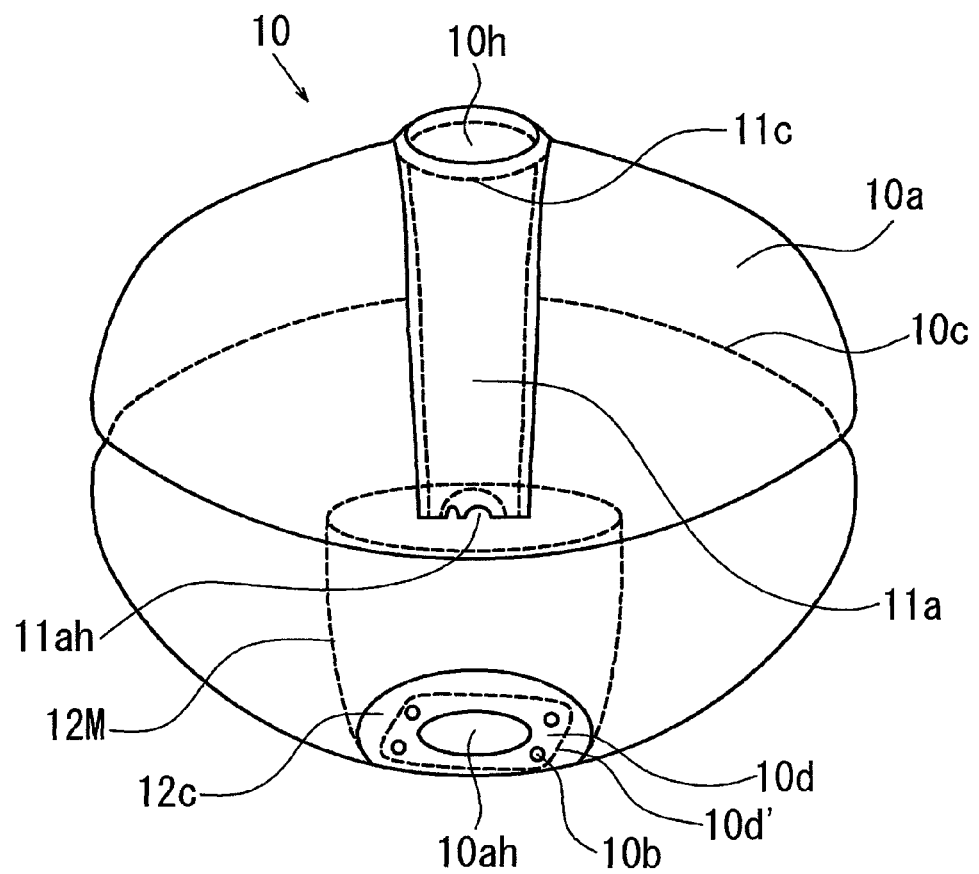
FIG. 17 is a see-through perspective view showing the interior of the inflated airbag.

FIG. 17 is a see-through perspective view typically showing the interior of an airbag 10 in as-inflated state. For brevity, the decorative member 40 inside the tubular tether belt 11*a*, the inflator 30 joined with the decorative member 40 and so forth are not shown. The protective member 12*c* for protecting the airbag from heat and an impactive pressure generated by the inflator, is overlaid on the peripheral part 10*d* to be stitched to a peripheral edge of the inflator attachment opening 10*ah* of the airbag 10. The gas rectification member 12 (here, gas rectification member 12M) for rectifying a gas flow direction is extended over the protective member 12*c* for enveloping the protective member 12*c* around thereof.

Figure 18A:
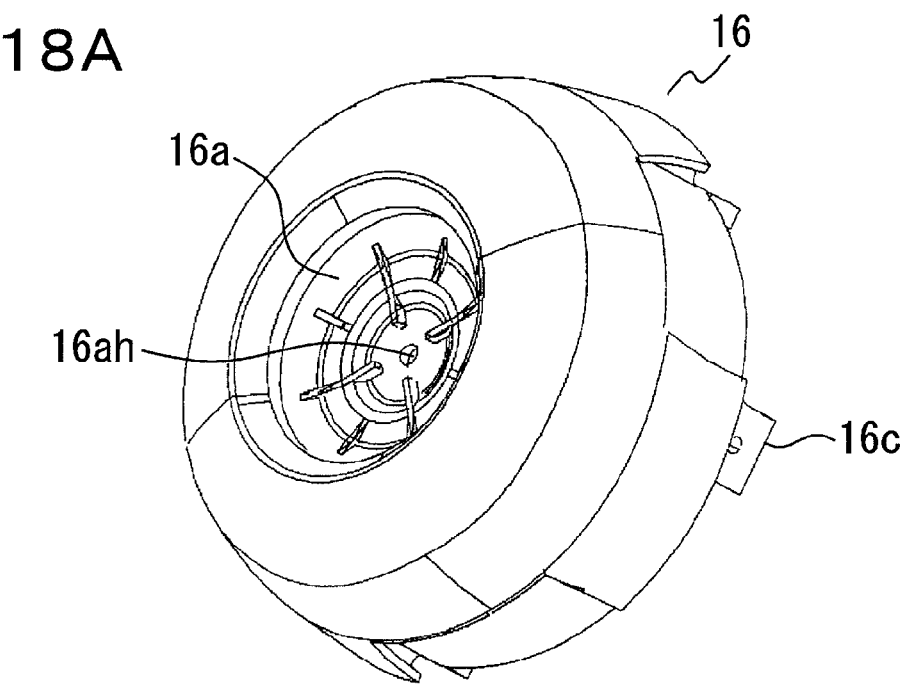
FIGS. 18A and 18B are a perspective view and a back side view of the airbag cover.

FIG. 18A is a perspective view of the airbag cover 16. The airbag cover 16 is formed of a synthetic resin so as to be substantially in a bowl-like shape, and the depressed part 16*a* for accommodating the decorative member 40 is provided at the central part of the airbag cover 16, as previously described.

The airbag cover 16 is secured to the base plate 24 with rivets through the intermediary of the airbag cover attachment pieces 24*a*. Further, with the decorative member 40 attached to the depressed part 16*a* of the airbag cover 16, a surface of the decorative member 40 is substantially flush with a surface of the airbag cover 16, as shown in FIG. 2.

Figure 18B:
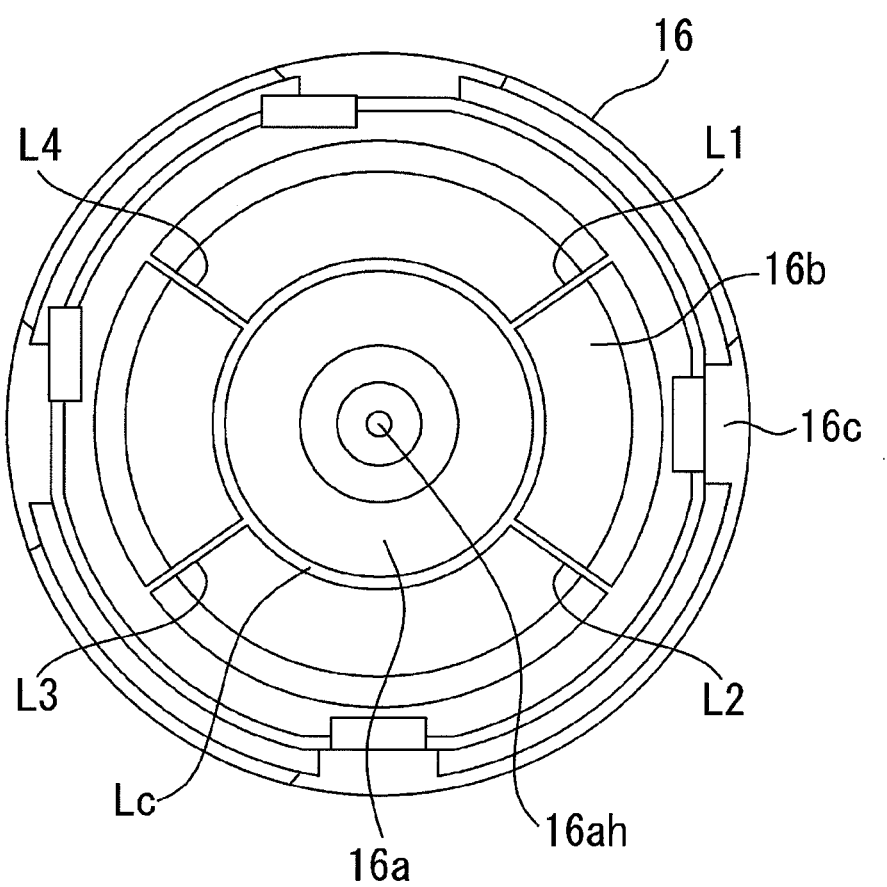

FIG. 18B is a back side view of the airbag cover 16. As shown in the figure, tear-lines (L1 to L4, Lc) in a groove-like shape, capable of splitting and tearing upon the inflation and expansion of the airbag 10, while leaving out the depressed part 16*a* at the center secured by the connecting member 20, are formed on the back side of the airbag cover 16. More specifically, the back side of the airbag cover 16 is provided with a series of the tear-lines comprising the tear-line Lc circular in shape, formed around the depressed part 16*a*, and a plurality of the tear-lines, for example, four pieces of the tear-lines L1 to L4, radially extended from the tear-line Lc, so as to enable the airbag cover 16 to be split into a plurality of cover pieces 16*b* with the depressed part 16*a* left out as it is, upon the airbag cover 16 being subjected to an inflation pressure of the airbag. Further, the airbag cover 16 is secured to the base plate 24 with the rivets such that the airbag cover 16 can be split into the respective cover pieces 16*b* upon the inflation of the airbag 10, and the respective cover pieces 16*b* can independently open up.

With the above structure, when the inflator 30 is actuated and the airbag 10 undergoes inflation and expansion by a gas pressure, the airbag cover 16 is pressed to be split along the respective tear-lines L around the decorative member 40 by a force of the inflation and expansion, whereupon the split cover pieces will open outward respectively, with the depressed part 16*a* in the bowl-like shape at the center being left out as it is, to be then completely cut apart and independently open up respectively, as described above.

Figure 19:
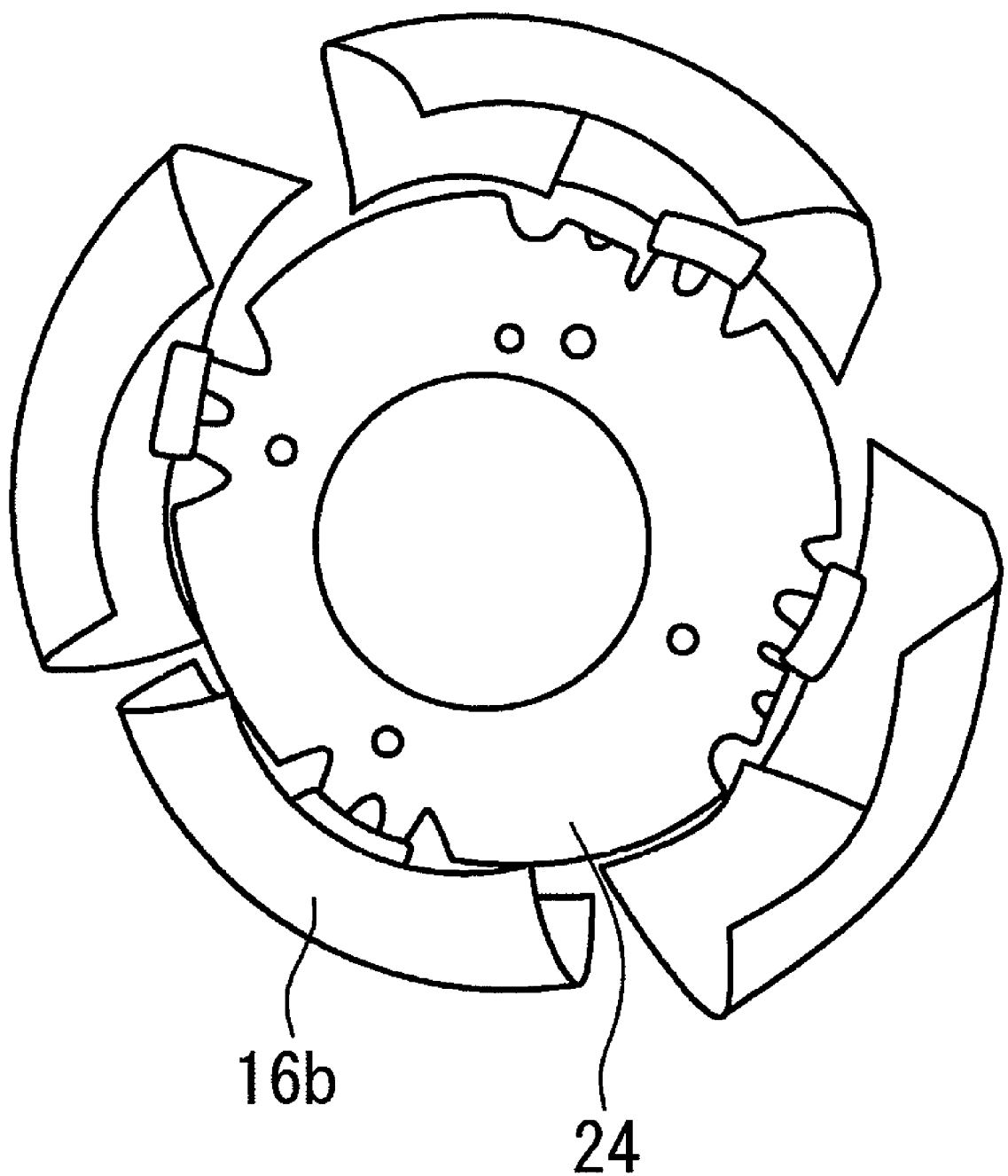
FIG. 19 is a view showing respective cover pieces in as opened-up state, as seen from an occupant side.

FIG. 19 is a view showing the respective opened-up cover pieces 16*b*, as seen from an occupant side. As shown in the figure, because the airbag cover 16 is split into the respective cover pieces 16*b* upon the expansion of the airbag 10, the airbag cover 16 will not interfere with the expansion of the airbag 10 in the direction of the side face thereof, after the airbag 10 passes through the anticipated rupture part 14*h* of the holding member 14. For brevity, the airbag and so forth are not shown in the figure.

Herein, there is described a process for assembling the airbag device M1 with reference to FIGS. 2 to 4, and FIGS. 7 and 18.

On assembling, the airbag 10 with the cushion ring 22 pre-contained therein and packaged in the holding member 14 is contained in the airbag cover 16 by aligning the position of a hole 16*ah* of the airbag cover 16 with that of the attachment hole 11*ah* of the tubular tether belt 11*a* of the airbag 10. Then, while the connecting member 20 is inserted into the airbag 10 such that a position of the hole 20*ah* of the central part of the connecting member 20 is aligned with that of the attachment hole 11*ah* of the tubular tether belt 11*a*, the bolt 22*d* protruding from the depressed part 22*c* of the cushion ring 22 into the airbag 10, as shown in FIG. 7D, is inserted into the attachment hole 20*e* of the connecting member 20, thereby fitting the attachment foot 20*c* into the depressed part 22*c*.

By inserting the attachment bolt 40*a* of the decorative member 40 into the hole 16*ah* of the depressed part 16*a* of the airbag cover 16 from the front side, it is possible to insert the attachment bolt 40*a* into the hole 16*ah* of the airbag cover 16, the attachment hole 11*ah* of the tubular tether belt 11*a* of the airbag 10 and the hole 20*ah* of the central part of the connecting member 20 disposed in alignment with the hole 16*ah* respectively. By screwing down a nut against the attachment bolt 40*a*, the attachment bolt insertion hole 14*hh* and the attachment hole 11*ah* of the tubular tether belt 11*a* are clamped and secured between the depressed part 16*a* of the airbag cover 16 and the central part 20*a* of the connecting member 20.

Then, by inserting the bolts 22*d* of the cushion ring 22 into the attachment holes 24*c* of the base plate 24 respectively, the cushion ring 22 is overlaid on the base plate 24 to thereby fit the base plate 24 to the airbag cover 16, and further the inflator 30 is snapped in between the bolts 22*d*, thereby screwing down a nut against the respective bolts 22*d*. By so doing, the inflator attachment opening 10*ah* and the protective member 12 are clamped and secured between the cushion ring 22, and the connecting member 20. As a result, assembling of the airbag device M1 shown in FIG. 2 is completed.

Figure 20A:
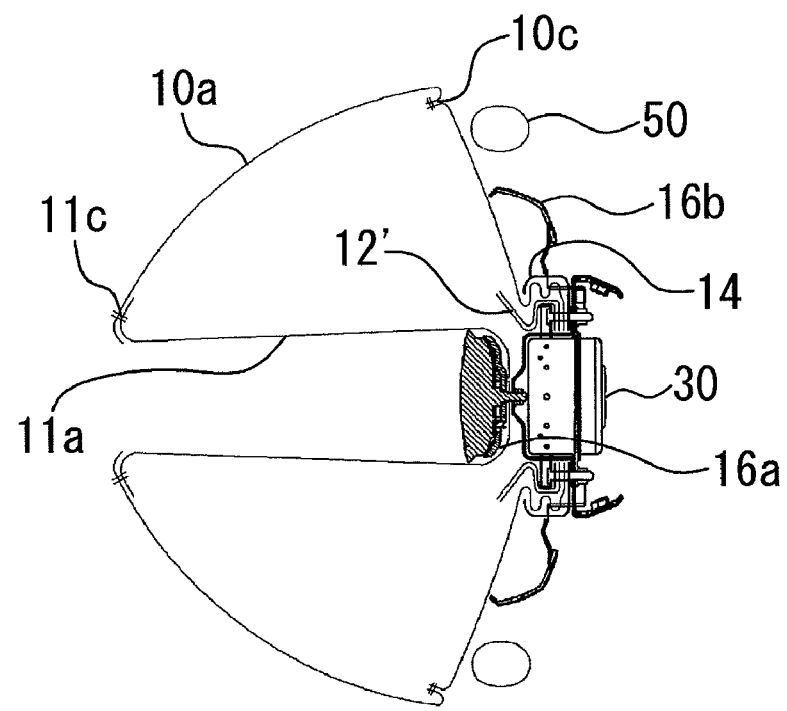
FIGS. 20A and 20B are views showing an expansion action of the airbag device.
Figure 20B:
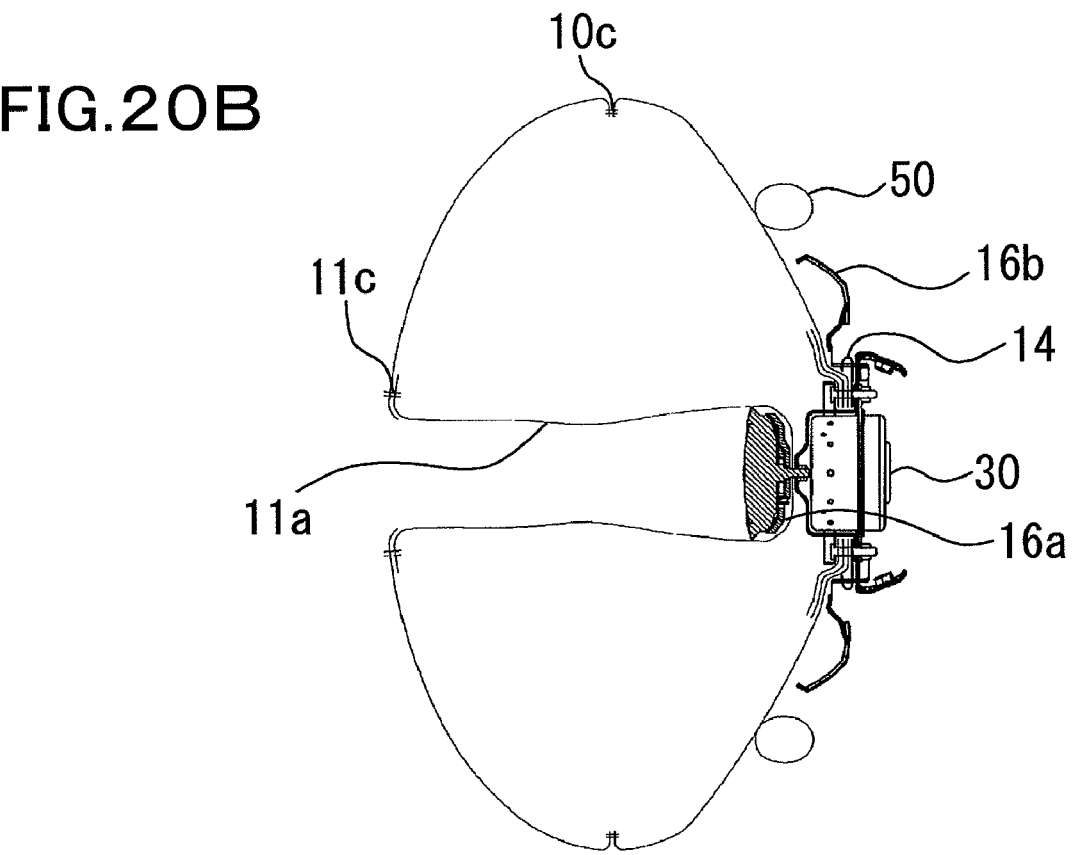

Referring to FIGS. 20A and 20B, there is described hereinafter an expanding action of the airbag device M1.

First, upon detection of an impact due to vehicle collision and so forth, ignition starts in the inflator 30 to thereby cause gas to be generated therein, and the gas is introduced into the airbag 10. When the airbag 10 starts inflation, the airbag cover 16 is subjected to a force of the inflation and is split along the tear-lines L1 to L4, and Lc, that is, with depressed part 16a as left out as it is, whereupon the respective cover pieces 16b will radially expand.

In the initial stage in which the gas is introduced into the airbag 10 and the airbag 10 starts to be inflated after the airbag cover 16 is split, as shown in FIG. 20A, inflation and expansion start from the stitched part 11c formed by stitching together the tubular tether belt 11a and the central part of the base fabric of the airbag 10 that will start inflation in the initial expansion, while enveloping the depressed part 16a with the tubular tether belt 11a, and the surface of the airbag 10 undergoes inflation toward the occupant side. Since the tubular tether belt 11a is folded in the longitudinal direction of the tube portion at the time of the inflation, the tubular tether belt 11a is hardly subjected to resistance upon extension thereof. When the airbag 10 undergoes inflation and expansion from the stitched part 11c, the airbag 10 undergoes expansion toward the occupant side while subjected to resistance upon passing through the anticipated rupture part 14h of the holding member 14. Accordingly, surface portion of the airbag 10 will sequentially be expanded toward the occupant side, while maintaining a degree of an internal pressure without causing halfway collapse of folded and contained airbag 10.

Meanwhile, FIG. 20A shows the fully stretched tubular tether belt 11a to its full length. Parts of the back side portion of the airbag 10 are inflated and expanded toward the occupant side, but the stitched part 10c formed by stitching together the respective outer circumferential edges of the two pieces of the base fabrics substantially circular in shape is positioned in the vicinity of the steering wheel 50, and other parts of the back side portion of the airbag 10 are still contained in the holding member 14. After the airbag has inflated to a degree, the position of the stitched part 10c shifts from the right-hand part of the figure toward the left as far as substantially the center along the center line of the tubular tether belt 11a, whereupon the airbag 10 is turned into the flat spherical shape, as shown in FIG. 20 B, thereby completing the inflation and expansion. Reference numeral 12' denotes the gas rectification member.

The airbag 10 exhibits a behavior whereby expansion thereof toward the occupant side is stopped following the tubular tether belt 11a stretching to its full length as described above, this behavior is to stop the rapid stretch of the tubular tether belt 11a due to the internal pressure immediately after splitting and to temporarily increase an internal pressure of the airbag inside the airbag cover 16 to obtain a splitting and tearing force, and in association with such stopping action, the airbag 10 is stretched, however, since a volume of the airbag 10 rapidly increases concurrently with expansion thereof, the internal pressure rapidly decreases. Whereas the airbag 10 itself tends to stretch by an inertial force thereof, however, the expansion of the airbag 10 toward the occupant side is stopped before the internal pressure sufficiently increases due to stoppage of the stretching of the tubular tether belt 11a and resistance by the holding member 14.

In the airbag device M1, an expansion velocity toward the occupant side after the stopping action of the tubular tether belt is actually decreased by half as compared with a expansion velocity of the remaining parts of the airbag 10 within the holding member 14, since the central part of the airbag 10 cannot shift toward the occupant side, harmfulness against occupants will decrease as compared with the case of an airbag device without the tubular tether belt 11a.

Such an advantageous effect as above is not limited to the case of the tubular tether belt 11a according to the airbag device M1, and the same effect is obtained in the case where a usual flat tubular tether belt is provided.

Figure 21:
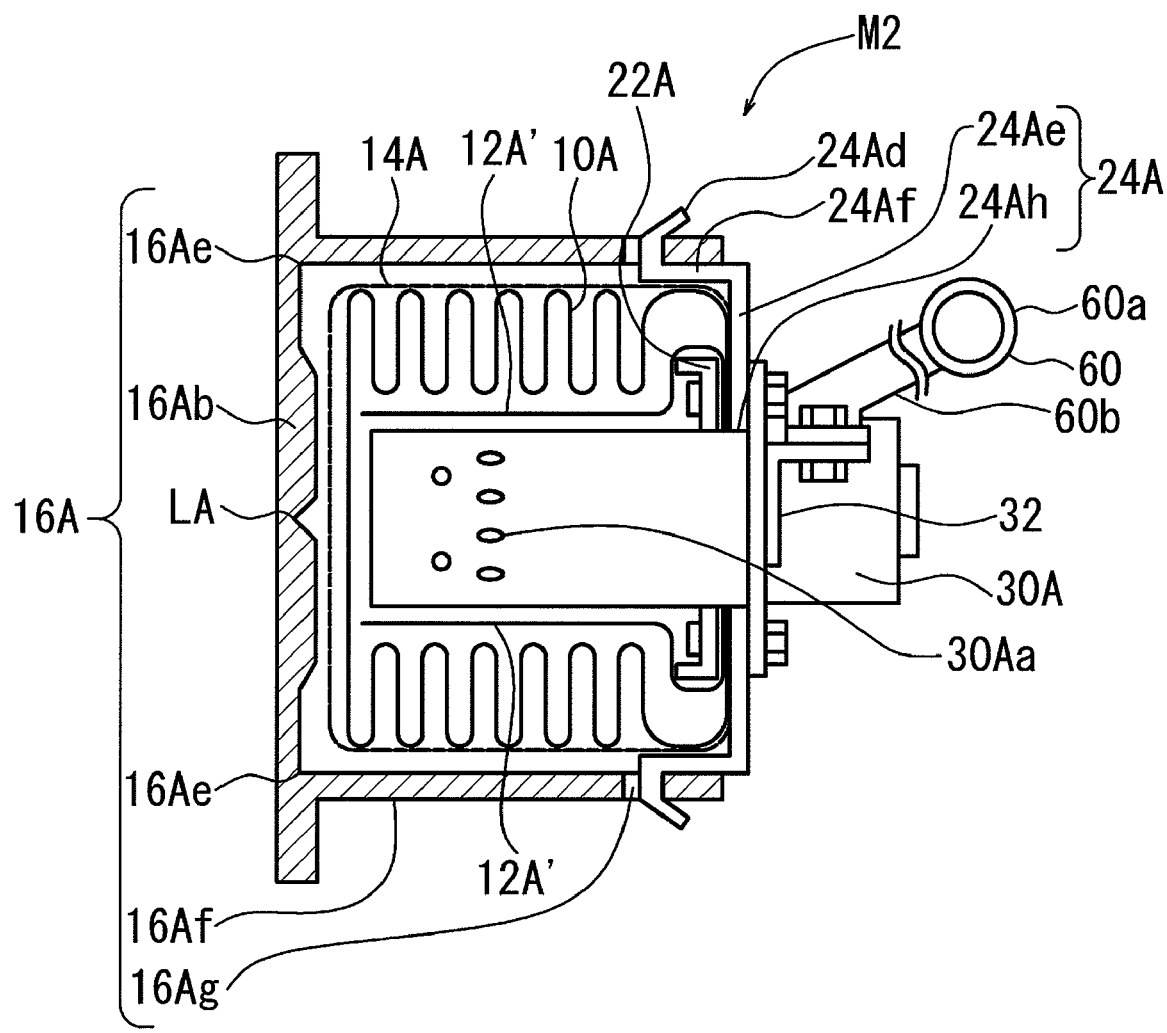
FIG. 21 is a view showing an airbag device for a front passenger seat.

Subsequently, there is described hereinafter an airbag device M2 for a front passenger seat. As shown in FIG. 21, the airbag device M2 comprises an folded airbag 10A, an inflator 30A for feeding a gas for inflation to the airbag 10A, and an airbag cover 16A in the shape of an approximately square cylinder for containing the airbag 10A, and the inflator 30A therein. The airbag device M2 is substantially the same in structure as the airbag device M1, and in describing the structure of the airbag device M2, like elements are given like reference numerals with "A" suffixed.

The airbag cover 16A is made up such that a tear-line LA disposed in the shape resembling the letter H is provided on the back side of the head in the shape of the approximately square cylinder in such a way as to enable the airbag cover 16A to be split into two pieces of cover pieces 16Ab to open, and the two pieces of the cover pieces 16Ab can open toward an upper side and a lower side respectively, as seen from the plane of the figure, with an upper edge and a lower edge of the respective cover pieces 16Ab, each serving as a hinge 16Ae. Further, a connecting wall unit 16Af in the shape of an approximately square cylinder protruding downward is provided on the back side of the head in the shape of the approximately square cylinder in such a way as to surround respective positions where the two pieces of the cover pieces 16Ab are to be disposed.

A plurality of stopper holes 16Ag are penetrated through respective predetermined positions of upper and lower walls of the connecting wall unit 16Af, opposed to each other. Stopper fingers 24Ad formed on a base plate 24A are inserted into the stopper holes 16Ag respectively, thereby engaging the stopper fingers 24Ad with the connecting wall unit 16Af. The respective stopper fingers 24Ad are secured to the connecting wall unit 16Af in order to ensure connection of the connecting wall unit 16Af with the base plate 24A so that the airbag 10A at the time of inflation can smoothly push up the two pieces of the cover pieces 16Ab to thereby enable the tear-line LA to be ruptured.

As shown in FIG. 21, the base plate 24A comprises a bottom wall part 24Ae in the shape of a rectangular sheet, formed of a sheet metal substantially rectangular in shape, having a rectangular opening, on the upper end side thereof, and a sidewall part 24Af extending so as to be in the shape of an approximately square cylinder from the outer peripheral edge of the bottom wall part 24Ae upward toward the airbag cover 16A. The bottom wall part 24Ae is formed in the shape of a rectangular sheet extended longer from side to side, and the central part thereof is provided with an inflator attachment opening 24Ah circular in shape, through which an upper side part of an inflator 30A can be inserted from below the bottom wall part 24Ae upward toward the airbag cover 16A.

Figure 22:
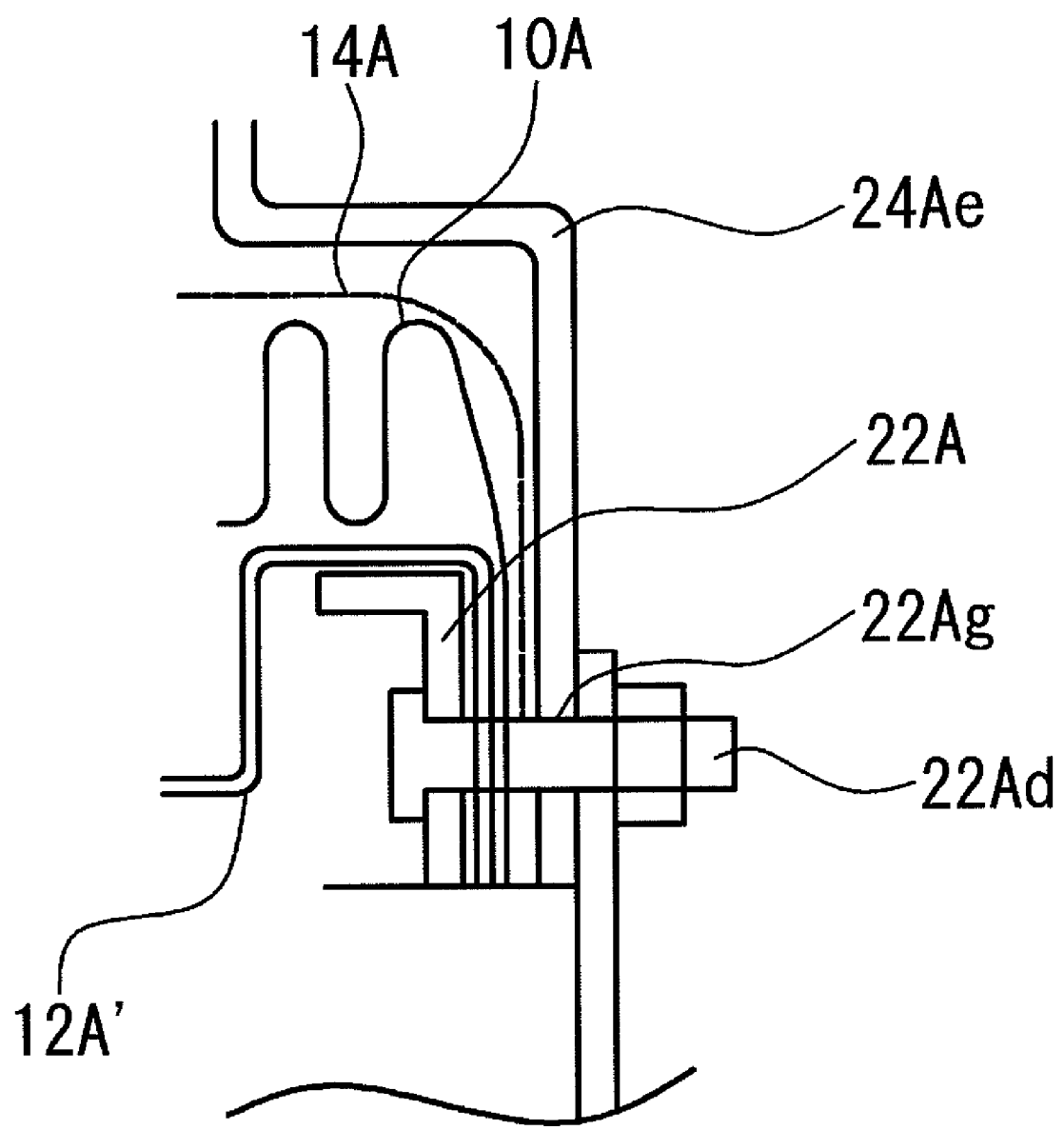
FIG. 22 is an enlarged view showing a clamped-secured state of a gas rectification member, an airbag, and a holding member.

As shown in FIG. 22, attachment holes 22Ag through which respective bolts 22Ad of a cushion ring 22A can be inserted are formed on the peripheral edge of the inflator attachment opening 24Ah of the bottom wall part 24Ae. Further, as shown in FIG. 21, a bracket 32 for connecting the base plate 24A on the side of a vehicle body 60 is secured to the respective undersides of both the right and left side of the bottom wall part 24Ae. A nut for screwing a bolt into each of the respective brackets 32 is securely attached thereto. A bracket 60b extending from a reinforcement 60a is provided on the side of the airbag device M2, adjacent to the vehicle body 60, and a bolt is penetrated through an attachment seat of the bracket 60b to be screwed with a nut. By tightening up the nuts against the bolts, respectively, the airbag device M2 is attached to, and secured to the body 60.

Next, there is described a procedure for assembling the airbag device M2 with reference to FIGS. 21 and 22.

FIG. 22 is an enlarged view showing a clamped-secured gas rectification member 12A', the airbag 10A and a holding member 14A. As is the case with the airbag 10 of the airbag device M1, except for the tubular tether belt 11a, the folded airbag 10A for use in the airbag device M2, incorporating the cushion ring 22A, described with reference to FIGS. 7A to 7D, is covered with the holding member 14A. The airbag 10A covered with the holding member 14A is contained in the airbag cover 16A, and the inflator attachment opening 24Ah of the base plate 24A is fitted onto the bolts 22Ad of the cushion ring 22A to thereby overlay the base plate 24A on the cushion ring 22A while the stopper fingers 24Ad of the base plate 24A are inserted into the stopper holes 16Ag of the airbag cover 16A respectively, to be secured thereto, thereby screwing nuts from the backside of the base plate 24A.

Thereafter, the base plate 24A, the cushion ring 22A and the inflator 30A are screwed together. By so doing, the gas rectification member 12A', the airbag 10A and a holding member 14A are clamped and secured between the cushion ring 22A and the base plate 24A, thereby completing assembling of the airbag device M2. Further, the shape of the airbag cover 16A of the airbag device M2 is not limited to that described as above, and decision on what shape is to be adopted for the airbag cover 16A can be made according to a design depending on an installation place of the airbag device M2, including, for example, the upper face of an instrument panel and so forth.

Further, since the airbag device M2 is not provided with the tether belt compared with the case of the airbag device M1, an expansion action of the airbag device M2 does not exhibit the behavior whereby expansion thereof toward the occupant side is temporarily stopped, and the airbag 10A undergoes inflation and expansion toward an occupant side while inflating from a portion thereof facing the occupant side with an internal pressure of the airbag maintained to a degree. Thus, because the airbag undergoes orderly inflation starting from the surface thereof on the occupant side by virtue of the gas rectification member 12A', even without the tether belt, and expands toward the occupant side with being subjected to resistance while passing through an ruptured opening of anticipated rupture parts of the holding member 14A, there will not occur a behavior whereby the airbag in whole bursts out in a lump concurrently with splitting and tearing of the airbag as folded, thereby inflicting harm on an occupant, so that occurrences of a punching phenomenon and a membrane phenomenon can be prevented with reliability.

Figure 23:
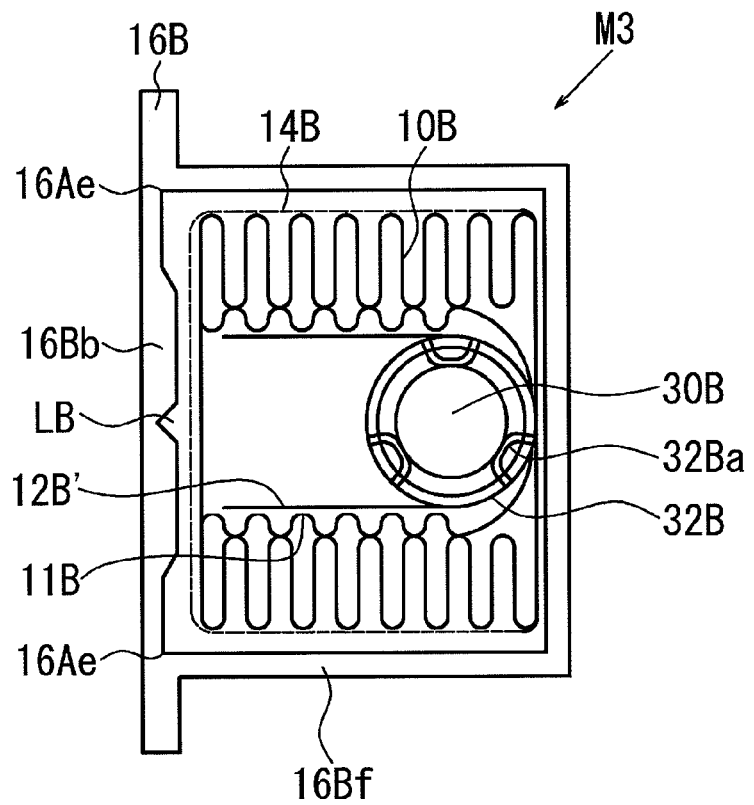
FIG. 23 is a schematic enlarged sectional view of the airbag device for the front passenger seat.

Subsequently, there is described hereinafter an airbag device M3 for a front passenger seat. The airbag device M3 shown in FIG. 23 is substantially the same in structure as the airbag devices M1, M2, respectively, and members of the airbag device M3, identical to those of the airbag devices M1, M2, respectively, are denoted by like reference numerals with "B" suffixed. FIG. 23 is a schematic enlarged longitudinal sectional view of the airbag device M3 for the front passenger seat. The airbag device M3 comprises an folded airbag 10B, an inflator 30B substantially columnar in shape, contained in the airbag 10B, for feeding a gas, a diffuser 32B for containing the inflator 30B therein, and an airbag cover 16B in the shape of an approximately square cylinder, for containing the airbag 10B, and the inflator 30B therein.

The airbag cover 16B is provided with a tear-line LB disposed in the shape resembling the letter H on the back side of a head part of the approximately square cylinder to enable the airbag cover 16B to be split into two pieces of cover pieces 16Bb to open, and the two pieces of the cover pieces 16Bb can open toward an upper and a lower side as seen from the plane of the figure respectively, by making use of an upper and a lower edge of the respective cover pieces 16Bb as a hinge 16Ae.

Further, a connecting wall unit 16Bf in the shape of an approximately square cylinder, protruding downward is provided on the back side of the head part of the approximately square cylinder in such a way as to surround respective positions where the two pieces of the cover pieces 16Bb are to be disposed.

The diffuser 32B is secured to the airbag cover 16B by inserting bolts (not shown) into the respective holes provided at a plurality of fixture positions of both members 32B and 16B and securing them.

The diffuser 32B is disposed between the inflator 30B and the folded and contained airbag 10B and is provided with a plurality of gas exhaust holes (not shown) through which a gas for inflation can flow out, so that the airbag device M3 is structured such that upon actuation of the inflator 30B, a gas generated from the inflator 30B passes through the gas exhaust holes of the diffuser 32B to thereby apply pressure to the central part of the folded and contained airbag 10B.

Reference numeral 11B denotes a usual tether belt unlike the tubular tether belt as previously described, and reference numeral 12B' denotes a gas rectification member. Both the members 11B, 12B' together with the airbag 10B overlapped one another are inserted between the respective members 32B and 16B on fixedly attaching the diffuser 32B to the airbag cover 16B, and the respective members 11B, 12B' are secured with bolts to be thereby being attached to the airbag device. Further, as is evident from FIG. 16, with the airbag device M3 employing the inflator 30B of the type described, the airbag 10B is not provided with the inflator attachment opening 10ah, but is provided with a communicating port for insertion of the inflator 30B, and the inflator 30B is inserted into the communicating port. Further, an airbag device wherein a gas from an inflator of an airbag device (not shown) into an airbag through a communicating port thereof from outside the airbag instead of inserting the inflator directly into the airbag is well known in the prior art.

Accordingly, the respective inflator attachment openings 10ah of the airbag 10,10A used in the airbag devices M1, M2, respectively, the communicating port for insertion of the inflator 30B and the communicating port of the well known airbag have the same function as the communicating port for introducing the gas from the inflator into the airbag, therefore, when the word of communicating port of the inflator is used, it will be understood that it means the inflator attachment opening, the communicating port for insertion of the inflator and the communicating port of the well known airbag as well.

Described as above, since the holding members 14, 14A and 14B of the embodiments have the anticipated rupture parts 14k, 14Ak, 14Bk, 14Ck and 14Dk formed of perforations, the holding members can hold the outer circumference part and peripheral edge part of the airbag during the assembling work of the airbags 10, 10A and 10B so that the folding state of the airbag is not collapsed and further the working time for assembling the airbag in the airbag cover 16 can be reduced, still further the holding members are ruptured with ease in the initial stage of expansion of the airbags to expand the airbags smoothly.

Since the holding members have the rupture stop parts 14h, 14Ah, 14Bh, 14Ch and 14Dh in addition to the anticipated rupture parts, when the anticipated rupture parts are ruptured in the initial stage of expansion of the airbags, the holding members is prevented from being cut apart beyond the perforations of the anticipated rupture part, and further the part of the airbag inflating in the initial stage of the expansion thereof can be expanded with ease.

Since the joints of the perforations of the anticipated rupture part 14h are located at positions to be pulled out by the bolts 22d engaged in the holes 14ah provided at centers of the four sides, the engagement state at four spots is kept balanced.

What is claimed is:

1. An airbag device comprising an inflator, an airbag communicating with the inflator for undergoing inflation by a gas generated from the inflator, a holding member for holding the airbag in a state as folded and contained therein, and pressing down a side face of the airbag on the outer circumference thereof, to thereby restrain inflation and expansion of the airbag in the direction of the side face thereof caused by the gas generated from the inflator at least in the initial stage of the expansion of the airbag, and a gas rectification member for rectifying and guiding the gas generated from the inflator up to the vicinity of a part of the airbag inflating in the initial stage of the expansion thereof, wherein the holding member is made of a woven cloth and an anticipated rupture part to be ruptured by the gas generated from the inflator is formed at the position corresponding to the part of the airbag, inflating in the initial stage of the expansion thereof, wherein the holding member has a hole for a fixture member at substantially the center thereof, and wherein the size of the anticipated rupture part of the holding member is larger than a diameter of a decorative member provided at substantially the central part of the airbag device.

2. The airbag device according to claim 1, wherein the part of the airbag inflating in the initial stage of the expansion thereof undergoes inflation and expansion by the gas guided by the gas rectification member.

3. The airbag device according to claim 1, wherein the anticipated rupture part is formed by perforations.

4. The airbag device according to claim 3, wherein rupture stop parts are formed on tip ends of the anticipated rupture part.

5. The airbag device according to claim 4, wherein the anticipated rupture part is formed radially from the center of the woven cloth.

6. The airbag device according to claim 5, wherein rupture stop parts are formed on a circumference of a concentric circle from the center of the woven cloth.

* * * * *